United States Patent
Minnette et al.

(10) Patent No.: US 9,809,360 B2
(45) Date of Patent: Nov. 7, 2017

(54) PACKAGE WITH PEELABLE CLOSURE

(71) Applicant: Berry Plastics Corporation, Evansville, IN (US)

(72) Inventors: Jeffrey C Minnette, Evansville, IN (US); Krishnaraju Varadarajan, Evansville, IN (US)

(73) Assignee: Berry Plastics Corporation, Evansville, IN (US)

( * ) Notice: Subject to any disclaimer, the term of this patent is extended or adjusted under 35 U.S.C. 154(b) by 118 days.

(21) Appl. No.: 14/807,389

(22) Filed: Jul. 23, 2015

(65) Prior Publication Data

US 2016/0023820 A1    Jan. 28, 2016

Related U.S. Application Data

(60) Provisional application No. 62/028,128, filed on Jul. 23, 2014, provisional application No. 62/029,264, filed on Jul. 25, 2014.

(51) Int. Cl.
*B65D 47/32* (2006.01)
*B65D 53/02* (2006.01)
(Continued)

(52) U.S. Cl.
CPC ......... *B65D 47/32* (2013.01); *B65D 43/0212* (2013.01); *B65D 51/1633* (2013.01); *B65D 53/02* (2013.01); *B65D 77/204* (2013.01); *B65D 81/34* (2013.01); *B65D 2205/025* (2013.01); *B65D 2543/0024* (2013.01); (Continued)

(58) Field of Classification Search
CPC ........ B65D 53/02; B65D 41/32; B65D 43/26; B65D 43/02; B65D 43/0256; B65D 43/0262; B65D 77/2032; B65D 77/2072; B65D 77/2036; B65D 77/2088; B65D 77/22; B65D 77/02; B65D 77/20; B65D 77/225; B65D 77/206; B65D 2543/00092; B65D 2543/00083; B65D 2543/0024; B65D 2543/00231; B65D 2543/00296; B65D 2543/0037; B65D 75/04; B65D 81/3453; B65D 81/34; B65D 81/3446; (Continued)

(56) References Cited

U.S. PATENT DOCUMENTS 2,614,727 A    10/1952 Robinson
2,772,013 A    11/1956 Stover
(Continued)

FOREIGN PATENT DOCUMENTS

CH    652965 A5    12/1985
DE    1232873 B    1/1967
(Continued)

OTHER PUBLICATIONS

European Search Report for European App. No. 14791028.5, 8 pages.
(Continued)

*Primary Examiner* — Andrew Perreault
(74) *Attorney, Agent, or Firm* — Barnes & Thornburg LLP

(57) ABSTRACT

A package includes a closure and a container. The closure is adapted to mate with a brim of the container to close a top opening arranged to open into an interior product-storage region formed in the container.

21 Claims, 23 Drawing Sheets

(51) Int. Cl.
*B65D 81/34* (2006.01)
*B65D 77/20* (2006.01)
*B65D 43/02* (2006.01)
*B65D 51/16* (2006.01)

(52) U.S. Cl.
CPC .............. *B65D 2543/00148* (2013.01); *B65D 2543/00296* (2013.01); *B65D 2543/00527* (2013.01); *B65D 2543/00537* (2013.01)

(58) Field of Classification Search
CPC ............ B65D 2205/00; B65D 2205/02; B65D 51/16; B65D 51/1638; B65D 51/1633
See application file for complete search history.

(56) References Cited

U.S. PATENT DOCUMENTS

| | | |
|---|---|---|
| 2,901,140 A | 8/1959 | Robinson |
| 3,102,182 A | 8/1963 | Heinz |
| 3,276,616 A | 10/1966 | Lurie |
| 3,521,422 A | 7/1970 | Tabor |
| 3,679,509 A | 7/1972 | Fielibert |
| 3,834,606 A | 9/1974 | Anderson |
| 3,913,785 A | 10/1975 | Pattershall |
| 3,934,749 A | 1/1976 | Andrulionis |
| 3,938,686 A | 2/1976 | Milligan |
| 3,956,550 A | 5/1976 | Sutch |
| 4,044,941 A | 8/1977 | Knudsen |
| 4,109,815 A | 8/1978 | Collins, III |
| 4,111,330 A | 9/1978 | Jordan |
| 4,141,463 A | 2/1979 | Smith |
| 4,171,084 A | 10/1979 | Smith |
| 4,192,434 A | 3/1980 | Conroy |
| 4,209,107 A | 6/1980 | Crisci |
| 4,215,797 A | 8/1980 | Chen |
| 4,238,047 A | 12/1980 | Helms |
| 4,252,248 A | 2/1981 | Obrist |
| 4,258,529 A | 3/1981 | Smith |
| 4,333,585 A | 6/1982 | Del Bon |
| 4,349,119 A | 9/1982 | Letica |
| 4,356,930 A | 11/1982 | Roper |
| 4,397,133 A | 8/1983 | Hume |
| 4,418,834 A | 12/1983 | Helms |
| 4,438,864 A | 3/1984 | Helms |
| 4,442,971 A | 4/1984 | Helms |
| 4,448,345 A | 5/1984 | Helms |
| 4,495,749 A | 1/1985 | Faller |
| 4,533,063 A | 8/1985 | Buchner |
| 4,595,117 A | 6/1986 | Walter |
| 4,685,273 A | 8/1987 | Caner |
| 4,692,132 A | 9/1987 | Ikushima |
| 4,738,374 A | 4/1988 | Ingemann |
| 4,775,076 A | 10/1988 | Horvath |
| 4,834,247 A * | 5/1989 | Oshima ................. B65D 75/12 219/734 |
| 4,838,008 A | 6/1989 | Hardy |
| 4,888,935 A | 12/1989 | Wythoff |
| 5,015,313 A | 5/1991 | Drew |
| 5,032,213 A | 7/1991 | Thomas |
| 5,039,001 A | 8/1991 | Kinigakis |
| 5,091,231 A | 2/1992 | Parkinson |
| 5,097,107 A | 3/1992 | Watkins et al. |
| 5,098,751 A | 3/1992 | Tamura |
| 5,174,460 A | 12/1992 | Minnette |
| 5,178,297 A | 1/1993 | Harold |
| 5,246,134 A | 9/1993 | Roth |
| 5,248,134 A | 9/1993 | Ferguson |
| 5,258,191 A | 11/1993 | Hayes |
| 5,316,603 A | 5/1994 | Akazawa |
| 5,348,752 A * | 9/1994 | Gorlich .................. B65B 7/168 206/484.1 |
| 5,377,873 A | 1/1995 | Minnette |
| 5,385,255 A | 1/1995 | Varano |
| 5,395,005 A | 3/1995 | Yoshida |
| 5,428,209 A | 6/1995 | Babu et al. |
| 5,443,853 A | 8/1995 | Hayes |
| 5,511,679 A | 4/1996 | Beck |
| 5,634,567 A | 6/1997 | Hekal |
| 5,647,501 A | 7/1997 | Helms |
| 5,692,635 A | 12/1997 | Farrell |
| 5,810,197 A | 9/1998 | Mazzarolo |
| 5,911,334 A | 6/1999 | Helms |
| 5,947,278 A | 9/1999 | Sawhney |
| 5,950,861 A | 9/1999 | Roth |
| 5,983,607 A | 11/1999 | Mihalov |
| 6,032,823 A | 3/2000 | Bacon |
| 6,053,353 A | 4/2000 | Helms |
| 6,145,689 A | 11/2000 | Kobayashi |
| 6,196,451 B1 | 3/2001 | Helms |
| 6,234,386 B1 | 5/2001 | Drummond |
| 6,439,387 B1 | 8/2002 | Bergman |
| 6,508,375 B1 | 1/2003 | Krall |
| 6,523,713 B1 | 2/2003 | Helms |
| 6,637,176 B1 | 10/2003 | Krall |
| 6,673,303 B2 | 1/2004 | White |
| 6,749,066 B2 | 6/2004 | Bergman |
| 6,772,901 B2 | 8/2004 | Witt |
| 6,799,692 B2 | 10/2004 | TeixeiraAlvares |
| 6,857,561 B2 | 2/2005 | Williams |
| 6,881,286 B2 | 4/2005 | Drummond |
| 6,923,017 B2 | 8/2005 | Dais |
| 7,055,713 B2 | 6/2006 | Rea |
| 7,086,545 B2 | 8/2006 | Mannion |
| 7,134,576 B2 | 11/2006 | Gringer |
| 7,267,243 B2 | 9/2007 | Steg |
| 7,311,218 B2 | 12/2007 | Varadarajan |
| 7,584,866 B2 | 9/2009 | Selina |
| 7,694,837 B2 | 4/2010 | Robertson |
| 7,703,626 B2 | 4/2010 | Witt |
| 7,757,879 B2 | 7/2010 | Schuetz |
| 7,870,967 B2 | 1/2011 | Sawyer |
| 7,938,293 B2 | 5/2011 | Gidumal |
| 7,968,033 B2 | 6/2011 | Mazzarolo |
| 8,245,869 B2 * | 8/2012 | Yasumuro ............ B65D 77/225 220/202 |
| 8,245,873 B2 | 8/2012 | Steg |
| 8,251,239 B2 | 8/2012 | Yeung |
| 8,343,561 B2 * | 1/2013 | Yasumuro ............. A47J 36/022 219/735 |
| 8,770,427 B2 | 7/2014 | Longo |
| 8,991,632 B2 | 3/2015 | Minnette |
| 8,998,030 B2 | 4/2015 | Minnette |
| 9,023,411 B2 * | 5/2015 | Maatta ............... B65D 77/2024 206/497 |
| 9,032,698 B2 | 5/2015 | Minnette |
| 9,067,347 B2 | 6/2015 | Naber |
| 2002/0125253 A1 | 9/2002 | Massey |
| 2003/0010787 A1 | 1/2003 | Dalton |
| 2003/0019878 A1 | 1/2003 | Scarabelli |
| 2003/0183636 A1 | 10/2003 | Shih |
| 2004/0065698 A1 | 4/2004 | Braunstein |
| 2004/0159080 A1 | 8/2004 | Stewart |
| 2005/0145632 A1 | 7/2005 | Cocca |
| 2005/0167430 A1 | 8/2005 | Varadarajan |
| 2006/0278603 A1 | 12/2006 | Takashima |
| 2007/0108216 A1 | 5/2007 | Kurth |
| 2007/0187352 A1 | 8/2007 | Kras |
| 2007/0205196 A1 | 9/2007 | Burney |
| 2008/0110896 A1 | 5/2008 | Westphal |
| 2008/0264961 A1 | 10/2008 | Sawyer |
| 2009/0032534 A1 | 2/2009 | Luburic |
| 2009/0032535 A1 | 2/2009 | Dunwoody |
| 2009/0113851 A1 | 5/2009 | Carr |
| 2009/0302040 A1 | 12/2009 | Fox |
| 2010/0059537 A1 | 3/2010 | Stevens |
| 2010/0096388 A1 | 4/2010 | Kobayashi |
| 2010/0140282 A1 | 6/2010 | Steg |
| 2011/0100990 A1 | 5/2011 | Clodfelter |
| 2011/0240641 A1 | 10/2011 | Huels |
| 2012/0199599 A1 | 8/2012 | Minnette |
| 2012/0205375 A1 | 8/2012 | Hudson |
| 2012/0234835 A1 | 9/2012 | Minnette |
| 2012/0270167 A1 | 10/2012 | Sato |
| 2012/0305560 A1 | 12/2012 | Minnette |

(56) References Cited

U.S. PATENT DOCUMENTS

| | | |
|---|---|---|
| 2013/0008904 A1 | 1/2013 | Minnette |
| 2013/0032598 A1 | 2/2013 | Triquet |
| 2013/0047559 A1 | 2/2013 | Minnette |
| 2013/0099414 A1 | 4/2013 | Minnette |
| 2013/0104505 A1 | 5/2013 | Minnette |
| 2013/0112690 A1 | 5/2013 | Jongsma |
| 2013/0153577 A1 | 6/2013 | Su |
| 2013/0270143 A1 | 10/2013 | Muscato |
| 2013/0292394 A1 | 11/2013 | Minnette |
| 2014/0116977 A1 | 5/2014 | Minnette |
| 2014/0117025 A1 | 5/2014 | Minnette |
| 2014/0215974 A1 | 8/2014 | Minnette |
| 2014/0262916 A1 | 9/2014 | Minnette |
| 2014/0326735 A1 | 11/2014 | Minnette |
| 2015/0203263 A1 | 7/2015 | Minnette |
| 2016/0023820 A1 | 1/2016 | Minnette |

FOREIGN PATENT DOCUMENTS

| | | | |
|---|---|---|---|
| DE | 2434823 | 2/1976 | |
| EP | 0536137 B1 | 8/1995 | |
| EP | 1930253 | 2/2011 | |
| FR | 1493462 A | 9/1967 | |
| FR | 2692224 | 12/1993 | |
| FR | 2827841 | 1/2003 | |
| FR | 2836460 | 8/2003 | |
| GB | 1408936 A | 10/1975 | |
| JP | 01226503 A | 9/1989 | |
| JP | 02219768 A | 9/1990 | |
| JP | 03289462 A | 12/1991 | |
| TH | WO 2013100058 A1 * | 7/2013 | ........... B65D 77/225 |
| WO | 2004103845 A2 | 12/2004 | |

OTHER PUBLICATIONS

European Search Report for Appl. No. 12745363.7 dated Jun. 20, 2014.
International Search Report and Written Opinion dated Apr. 14, 2014, relating to International Application No. PCT/US2013/070273.
International Search Report dated Jun. 20, 2012, relating to International Application No. PCT/US2012/28010.
International Search Report dated May 11, 2012, relating to International Application No. PCT/US2012/023639.
International Search Report dated Sep. 28, 2012, relating to International Application No. PCT/US2012/045965.
Notice of Allowance dated Aug. 21, 2014 for U.S. Appl. No. 13/362,953.
Office action dated Aug. 29, 2013 for U.S. Appl. No. 13/362,953.
Office action dated Feb. 27, 2014 for U.S. Appl. No. 13/362,953.
International Search Report and Written Opinion dated Sep. 4, 2014, relating to International Application No. PCT/US2014/035837.
Office Action dated Jun. 9, 2014 for U.S. Appl. No. 13/544,753.
Notice of Allowance dated Dec. 24, 2014 for U.S. Appl. No. 13/362,953.
Office Action dated Aug. 18, 2015 for U.S. Appl. No. 13/661,704.
Notice of Allowance dated Dec. 2, 2013 for U.S. Appl. No. 13/544,753.
Notice of Allowance dated Jan. 22, 2015 for U.S. Appl. No. 13/544,753.
English summary of Mexican Office Action issued in connection to Mexican Patent Application No. MX/a/2013/008849, dated Sep. 22, 2015, 4 pages.
PCT International Search Report and Written Opinion completed by the ISA/US dated Mar. 19, 2015 and issued in connection with PCT/US2015/012497.
Notice of Allowance dated Dec. 18, 2013 for U.S. Appl. No. 13/693,832.
Notice of Allowance dated Jun. 20, 2014 for U.S. Appl. No. 13/693,832.
Notice of Allowance dated Mar. 16, 2015 for U.S. Appl. No. 13/693,832.
Notice of Allowance dated Sep. 30, 2014 for U.S. Appl. No. 13/544,753.
Office Action dated Jan. 21, 2016 for U.S. Appl. No. 13/661,704.
International Search Report and Written Opinion dated Dec. 22, 2015, relating to International Application No. PCT/US2015/041784.
Office Action dated Mar. 21, 2016 for U.S. Appl. No. 14/603,083.
Office Action dated Mar. 28, 2016 for U.S. Appl. No. 14/264,512.
Office Action dated Sep. 2, 2016 for U.S. Appl. No. 14/603,083.
Office Action dated Sep. 26, 2016 for U.S. Appl. No. 14/245,237.

* cited by examiner

PACKAGE WITH PEELABLE CLOSURE

PRIORITY CLAIM

This application claims priority under 35 U.S.C. §119(e) to U.S. Provisional Application Ser. Nos. 62/028,128, filed Jul. 23, 2014 and 62/029,264, filed Jul. 25, 2014, each of which being expressly incorporated by reference herein.

BACKGROUND

The present disclosure relates to a package, and particularly to a package including a closure for mounting on a brim of a container. More particularly, the present disclosure relates to a reclosable closure provided with a membrane sheet that mates with a container brim when the closure is mounted on the container brim.

SUMMARY

A package in accordance with the present disclosure includes a closure adapted to mate with a brim of a closure to close a top opening that opens into an interior product-storage region formed in the container. In illustrative embodiments, the closure includes a sheet-support ring adapted to be mated with and mounted on the container brim and a thin membrane sheet bonded permanently to the sheet-support ring and arranged to cover the top opening formed in the container when the sheet-support ring is mounted on the container brim.

In illustrative embodiments, a portion of the thin membrane seal that is not bonded permanently to the sheet-support ring is bonded temporarily to a ring-shaped sheet-bonding zone provided along an inner perimeter edge of the container brim at a factory using any suitable means to establish an endless hermetic seal between the closure and the container that extends along the container brim around the top opening formed in the container. While this temporary bond between the membrane sheet of the closure and the brim of the container is broken to break the hermetic seal the first time a consumer removes the closure from the container, the permanent bond established between the sheet-support ring and the membrane sheet is not broken. Therefore the closure comprising the ring and sheet remains intact and unbroken when the membrane sheet is peeled away from the sheet bonding zone provided on the container brim the first time a consumer removes the closure from the container brim to open the package. After such a first removal, the closure can be re-mounted on the container brim repeatedly to close the package but without establishing any subsequent hermetic seal between the closure and the container.

In illustrative embodiments, the temporary bond also establishes a hermetic steam-venting system included in the package. The hermetic steam-venting system is configured to provide a hermetic seal between the closure and the container until a user separates the closure from the container or a user applies a predetermined amount of heat to the interior product-storage region to cause sufficient pressure to form in the interior product-storage region so that a pressurized air-discharge outlet is formed between the membrane sheet and the brim of the container in the sheet bonding zone during heating so that a uniform temperature is provide to products stored in the interior product-storage region.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 27 shows the closure in a closed position on the container brim wherein the membrane sheet is bonded permanently to the sheet-support ring and temporarily to an inner perimeter region of the container brim;

FIG. 28 shows the closure after the first pivotable sheet-separator lever included in the sheet-support ring of the closure has been pivoted about the first bend line through an angle of about 15° to cause initial separation of the middle portion of the membrane sheet from the container brim; and FIG. 29 shows the closure after the first pivotable sheet-separator lever included in the sheet-support ring of the closure has been pivoted about the first bend line through an angle of about 30° to cause further separation of the middle portion of the membrane sheet from the container brim.

DETAILED DESCRIPTION

Figure 14:
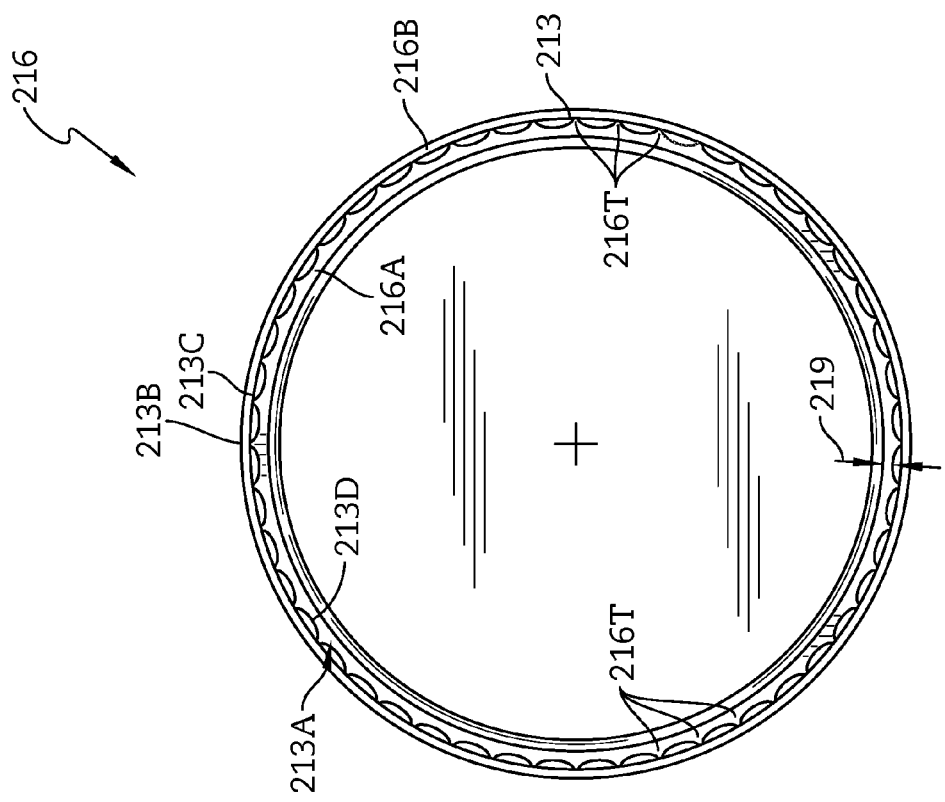
FIG. 14 is another embodiment of a movable heated sealing head in accordance with the present disclosure.
Figure 15:
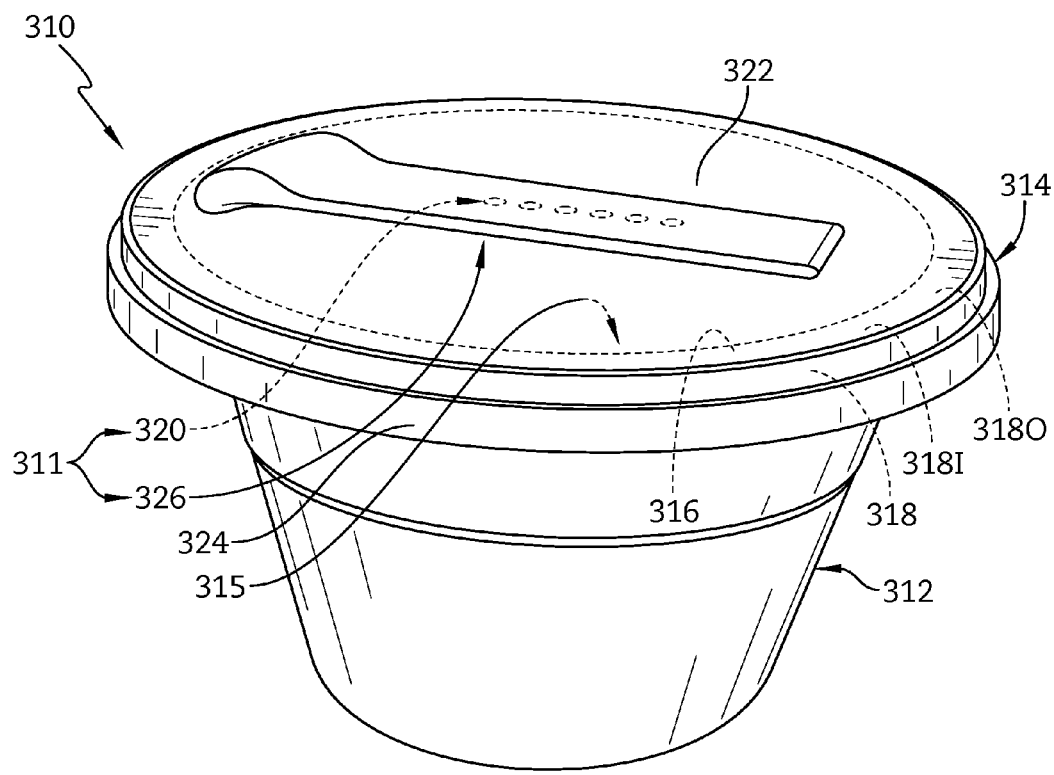
FIG. 15 is a perspective view of another package in accordance with the present disclosure showing that the package includes a container, a closure coupled to the container, and a hermetic steam-venting system including a series of spaced apart aperture (shown in phantom) and a peel strip covering the spaced-apart aperture.

A first embodiment of a package 110 in accordance with the present disclosure is shown in FIGS. 1-9. Package 110 includes a hermetic steam-venting system 111 configured to provide means for blocking movement of fluids between an interior product-storage region 15 formed in package 110 and atmosphere surrounding package 110 until at least a predetermined amount of heat has been applied to package 110 to cause sufficient pressure to be generated in interior-product storage region 151. A second embodiment of a package 10 including a hermetic steam-venting system 11 in accordance with the present disclosure is shown in FIGS. 16-29. A third embodiment of a package 310 including a hermetic steam-venting system 311 in accordance with the present disclosure is shown in FIG. 15. A first embodiment of a movable sealing head 116 used to establish a package in accordance with the present disclosure is shown in FIGS. 10-13. A second embodiment of a movable sealing head 216 used to establish a package in accordance with the present disclosure is shown in FIG. 14.

A package 110 in accordance with the present disclosure is shown in FIGS. 1-9. Package 110 includes container 12, a closure 114 configured to mount on container 12, and a hermetic steam-venting system 111 as suggested in FIGS. 2 and 3. Steam-venting system 111 is configured to block movement of fluids between interior product-storage region 15 and atmosphere surrounding package 110 until at least a predetermined amount of heat has been applied to package 110 to cause sufficient pressure to be generated in interior product-storage region 15.

Figure 1:
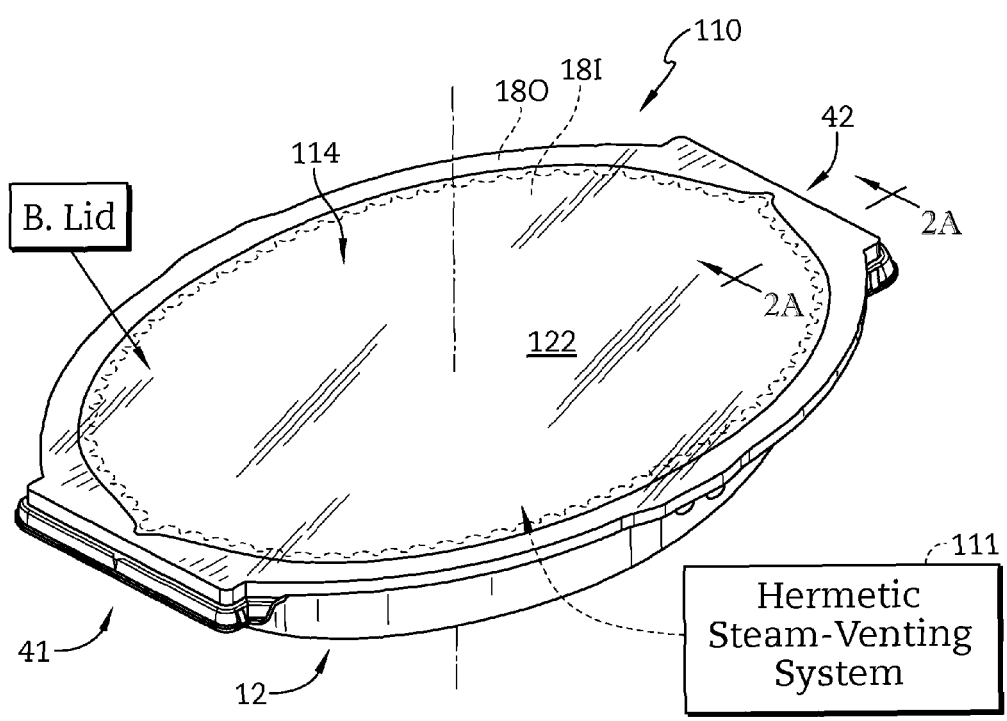
FIG. 1 is a perspective and diagrammatic view of a package in accordance with the present disclosure and showing that the package includes a container, a closure mounted on a brim of the container and made of a substantially flat membrane sheet bonded permanently to an upwardly facing surface of a sheet-support ring, and a hermetic steam-venting system configured to vent steam generated during heating in controlled matter as suggested in FIGS. 8 and 9.
Figure 2:
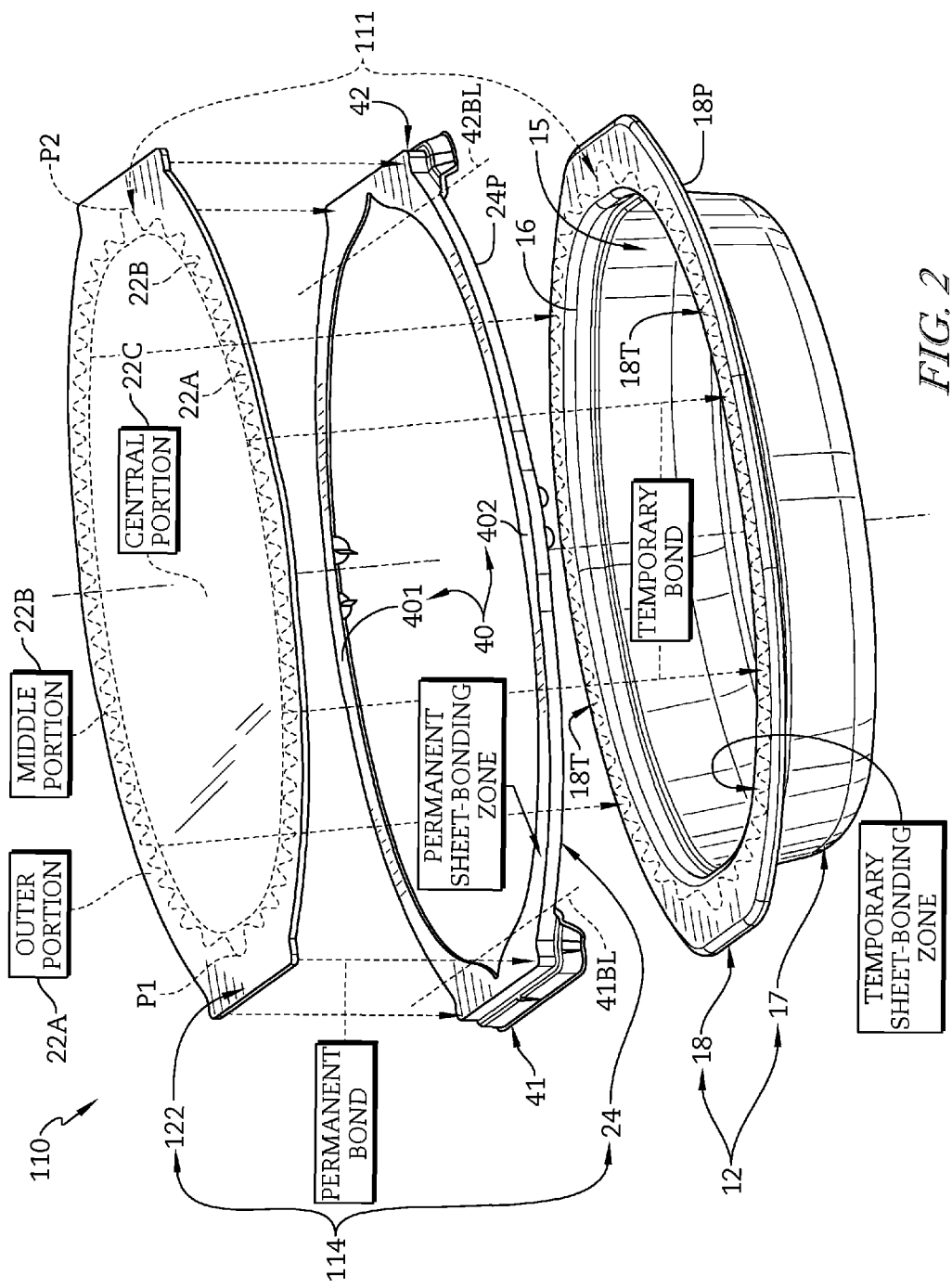
FIG. 2 is an exploded perspective assembly view of the package of FIG. 1 showing that the package includes (from bottom to top) the container, the sheet-support ring, a membrane sheet made of a thin film and adapted to be bonded permanently to a permanent sheet-bonding zone formed on an endless upwardly facing top surface of the sheet-support ring and to be bonded temporarily to a temporary sheet-bonding zone formed on an inner perimeter region of an endless upwardly facing top surface of the container brim and suggesting that the hermetic steam-venting system is established in the temporary sheet-bonding zone.
Figure 3:
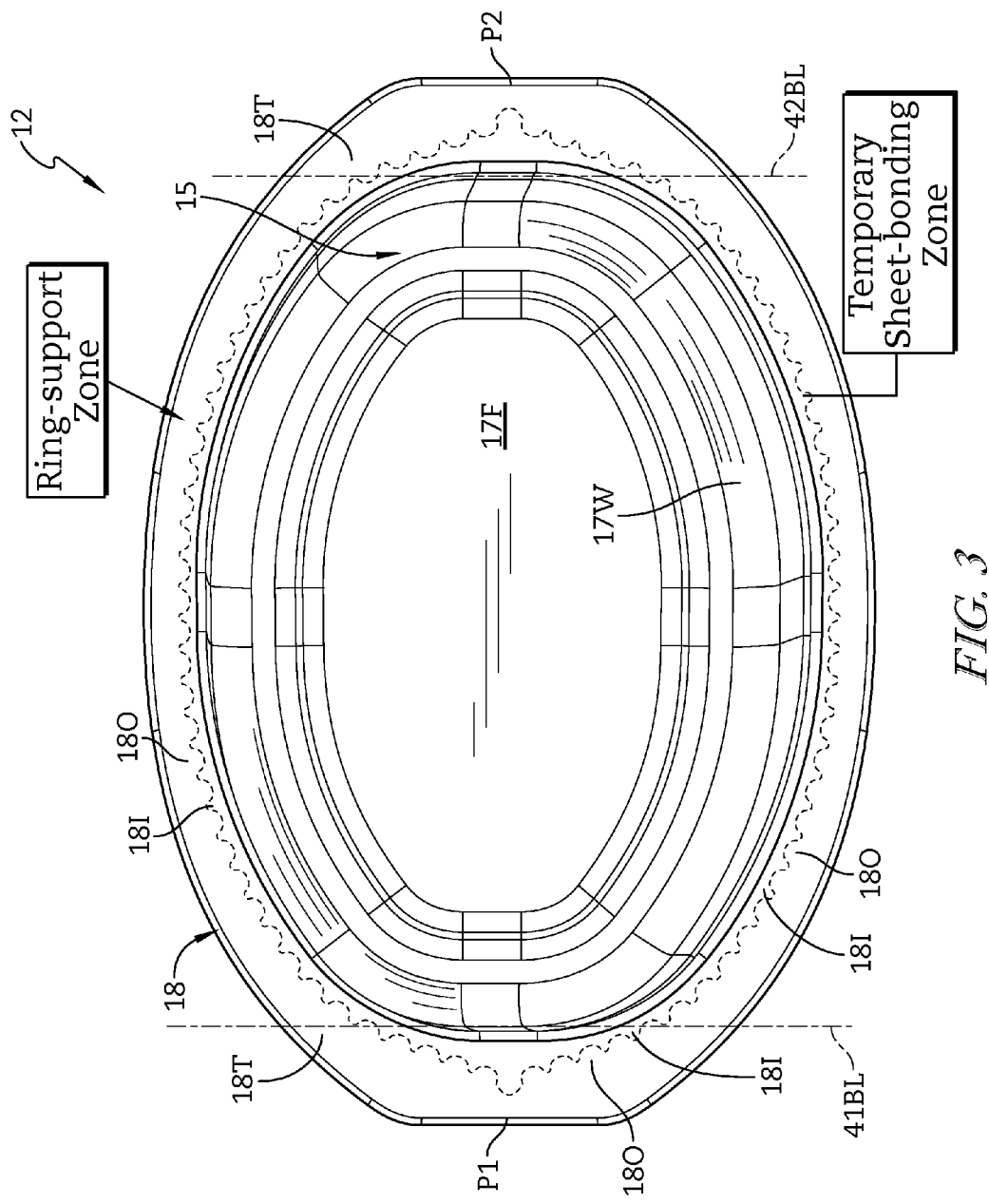
FIG. 3 is an enlarged top plan view of the container of FIG. 2 showing the temporary sheet-bonding zone provided on an inner perimeter region of an endless upwardly facing top surface of the container brim and suggesting that the steam-venting system includes an inner sealed ring and a series of spaced-apart sealed tethers extending outwardly from the inner sealed ring.

As shown in FIG. 2, closure 114 includes a membrane sheet 122 made of a thin film and sheet-support ring 24 configured to mate permanently with membrane sheet 122 in a permanent sheet-bonding zone provided on an endless upwardly facing top surface of sheet-support ring 24. Sheet-support ring 24 is configured to mate with brim 18 in the ring-support zone provided in outer perimeter region 18O of the endless upwardly facing top surface of brim 18 when closure 114 is mounted on container 12 to close package 10 as suggested in FIG. 1.

Figure 4:
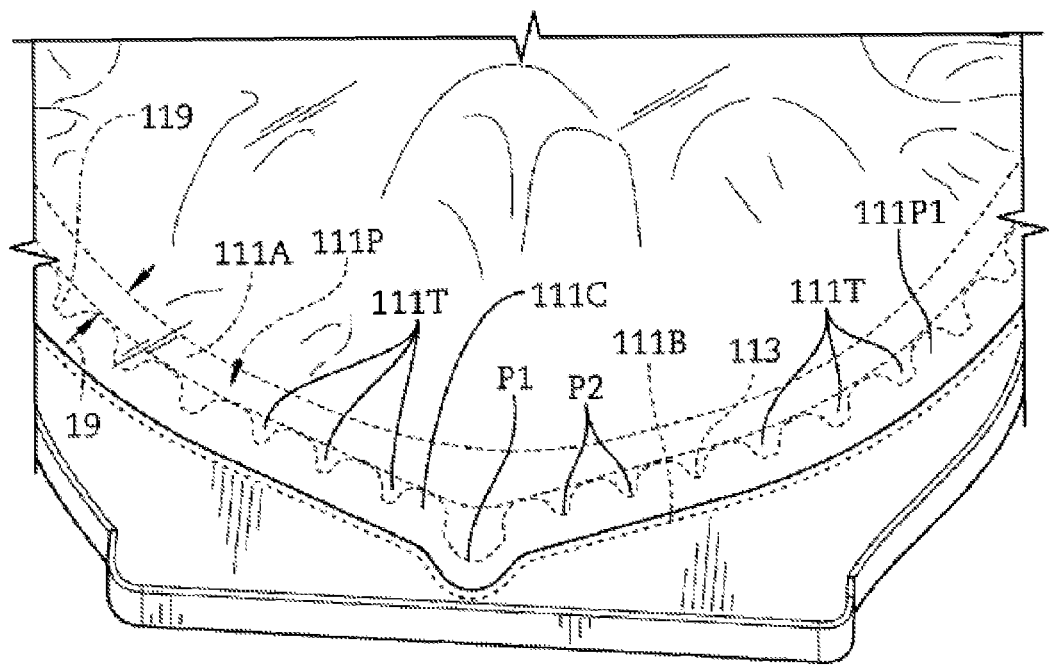
FIG. 4 is a partial perspective view showing one portion of the package of FIGS. 2 and 3 prior to heating suggesting that the temporary sheet-bonding zone is still intact and the hermetic steam-venting system is in a closed arrangement blocking communication of fluids between the interior product-storage region and atmosphere surrounding the package.

Membrane sheet 122 of closure 114 is also configured to mate temporarily with an endless inner perimeter region 18I of brim 18 in a temporary sheet-bonding zone to establish an endless hermetic seal between container 12 and closure 114 when sheet-support ring 24 is first mounted on container brim 18 at a package-filling factory to cause closure 114 to close opening 16 formed in container 12 as suggested in FIG. 4.

It is within the scope of this disclosure to use any suitable means to provide such a temporary bond and an endless hermetic seal between membrane sheet 22 of closure 14 and brim 18 of container 12 at a package-filling factory. In one example, the temporary bond is a chemical bond provided using a movable sealing head 116 as shown in FIGS. 10-13. The movable sealing head provides heat to portions of closure 114 so as to establish the chemical bond. In one example, the hermetic seal and portions of the temporary bond may be broken when the consumer applies a predetermined amount of heat to the interior product-storage region 15 to cause steam to be generated in interior product-storage region 15. In another example, the hermetic seal and the entire temporary bond may be broken when the consumer removes closure 114 from container brim 18.

Hermetic steam-venting system 111 is formed as a result of establishing the temporary bond between container 12 and membrane sheet 122 of closure 114. Hermetic steam-venting system 111 is configured to provide means for forming a pressurized air-discharge outlet between membrane sheet 122, brim 18, and sheet-support ring 24 so that pressurized fluid in interior product-storage region 15 passes over brim 18 toward a perimeter edge 18P of brim 18 and flows to atmosphere surrounding package 110 in response to application of a predetermined amount of heat to interior product-storage region 15.

Hermetic steam-venting system 111 includes an inner sealed annular ring 111A, a series of spaced-apart sealed tethers 111T, and an outer sealed ring 111B as suggested in FIG. 4. Inner sealed annular ring 111A is located between sheet-support ring 24 and interior product-storage region 15 as shown in FIG. 4. Series of spaced-apart sealed tethers 111T are appended to inner sealed annular ring 111A and arranged to extend outwardly away from interior product-storage region 15 toward sheet-support ring 24. Outer sealed ring 111B located between series of spaced-apart sealed tethers 111T and a perimeter edge 24P of sheet-support ring 24. An unsealed region 111C is formed between membrane sheet 122, brim 18, spaced-apart sealed tethers 111T, and inner sealed annular ring 111A.

Inner sealed annular ring 111A is formed as a result of establishing the temporary bond between membrane sheet 122 and brim 18. Series of spaced-apart sealed tethers 111T are formed as a result of establishing the temporary bond between membrane sheet 122 and brim 18. Outer sealed ring 111B is formed as result of establishing the permanent bond between membrane sheet 122 and sheet-support ring 24.

In one illustrative example, inner sealed annular ring 111A has a generally constant width 19 of about 0.0875 inches and is arranged to extend around and surround opening 16. Width 19 is selected so that the temporary bond that forms inner sealed annular ring 111A fails when interior product-storage region 15 is exposed to a predetermined amount of heat and a sufficient pressure is generated in interior product-storage region 15.

Each sealed tether 111T is spaced apart from every other neighboring sealed tether 111T. When portions of inner sealed annular ring 111A fail as a result of being exposed to a predetermined amount heat, steam flows through an outer portion 111P1 of a pressurized air-discharge outlet 111P is formed between each pair of neighboring sealed tethers 111T. In one example, pressurized air-discharge outlet 111P is formed between each pair of sealed tethers 111T. In another example, pressurized air-discharge outlets only form between some pairs of sealed tethers 111T. Sufficient pressurized air-discharge outlets form so as to minimize risks of unintended failure of closure 114 due to over-pressurization in interior product-storage region 15.

Figure 5:
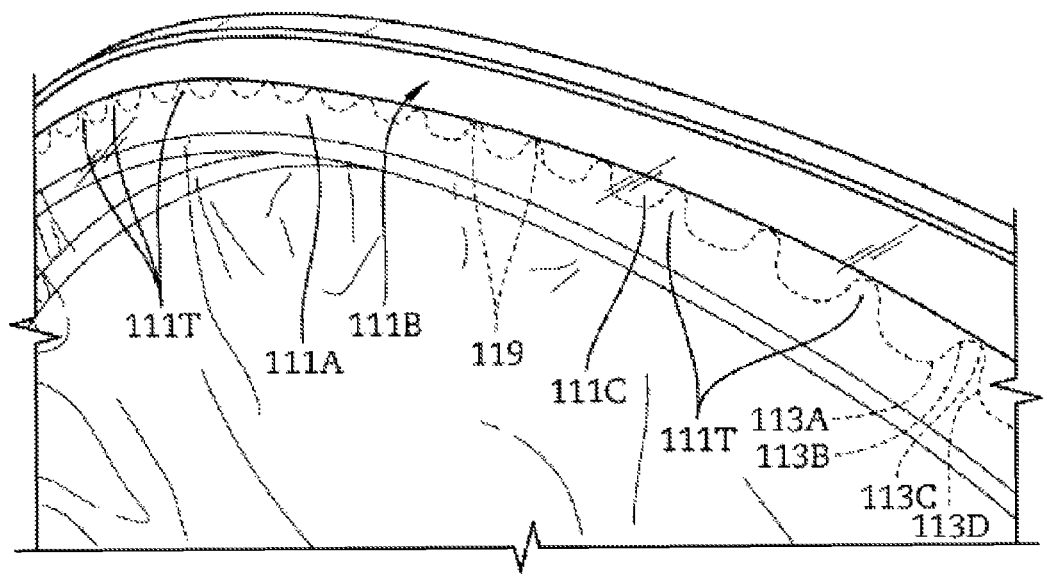
FIG. 5 is a partial perspective view showing another portion of the package of FIG. 4.
Figure 6:
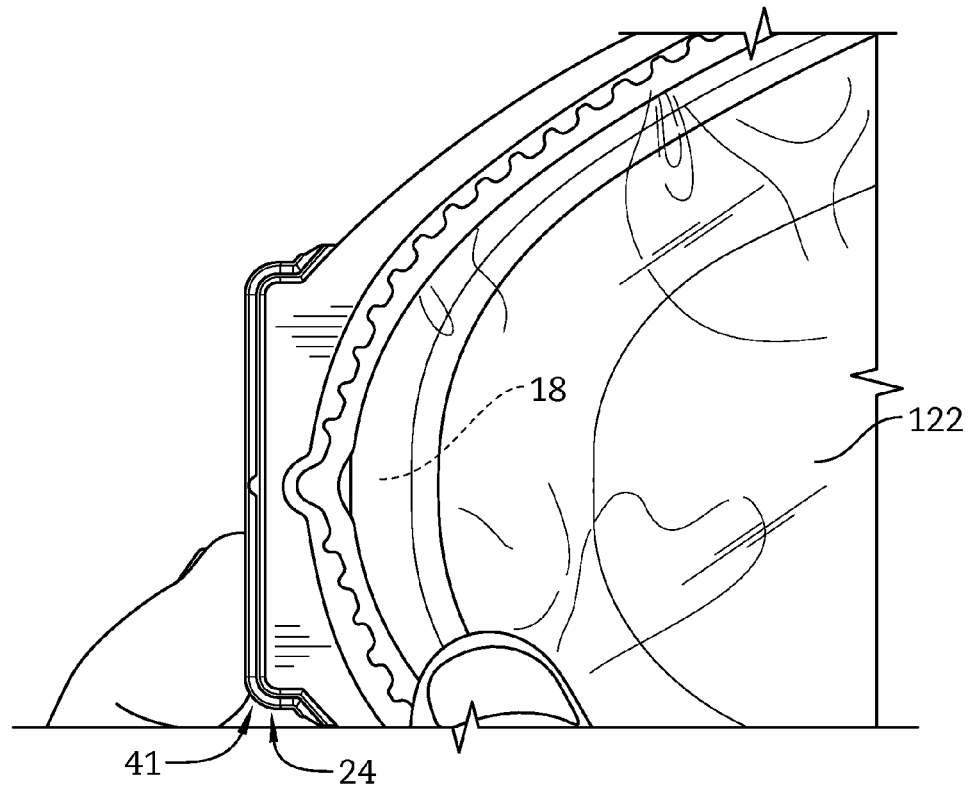
FIG. 6 is a view similar to FIG. 4 showing initial separation of the closure from the container.
Figure 7:
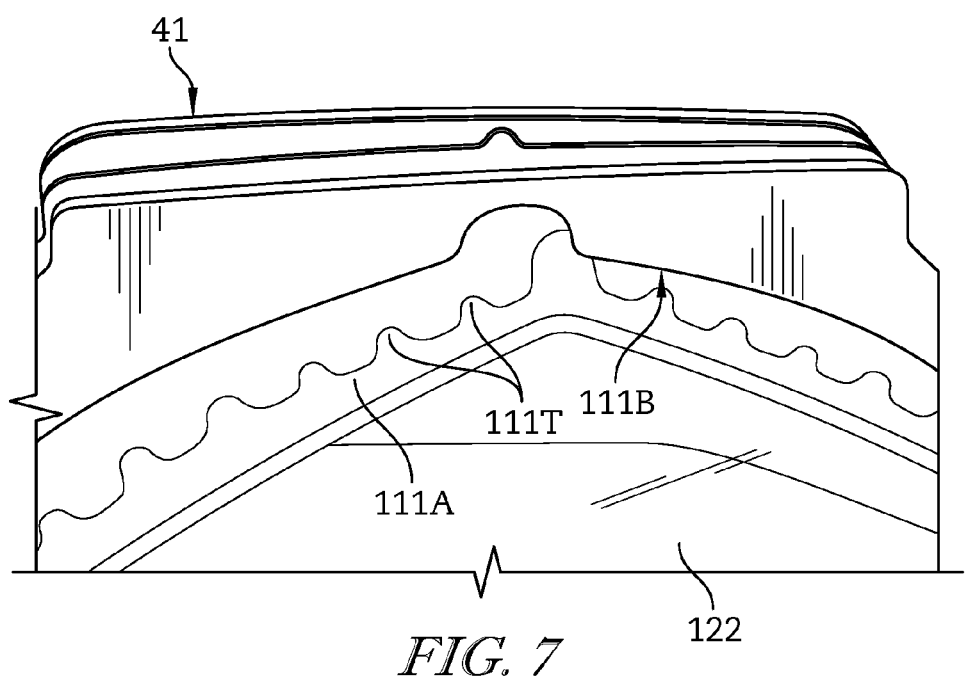
FIG. 7 is a partial perspective view showing initial separation of the closure from the container.
Figure 8:
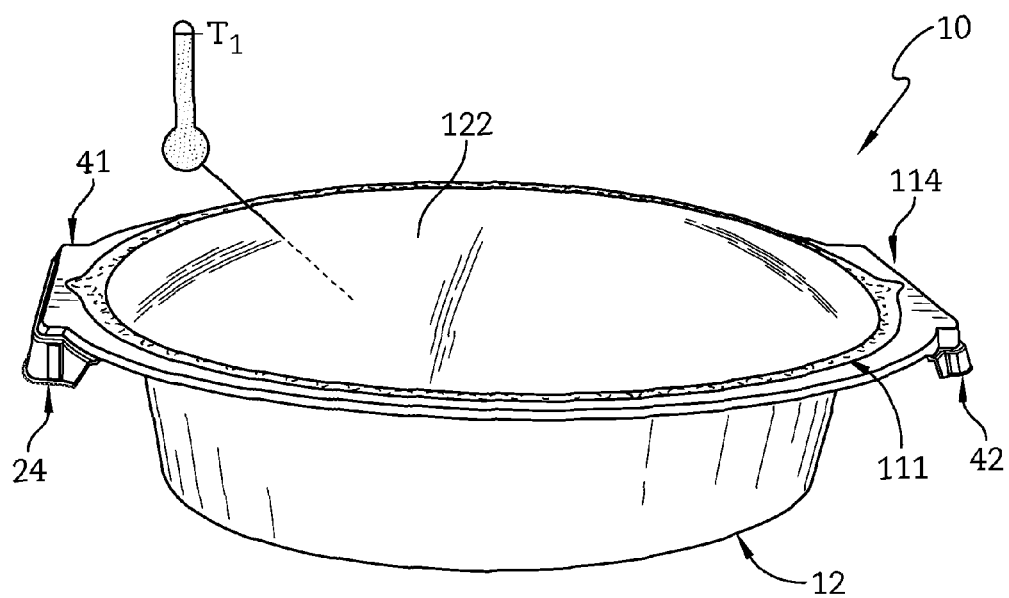
FIG. 8 is a diagrammatic view of the package of FIGS. 1-5 undergoing heating in a microwave causing the steam venting-system to be in an opened arrangement in which pressurized steam formed in the interior product-storage region as a result of heating to a first temperature $T_1$ is discharged in a controlled manner.
Figure 9:
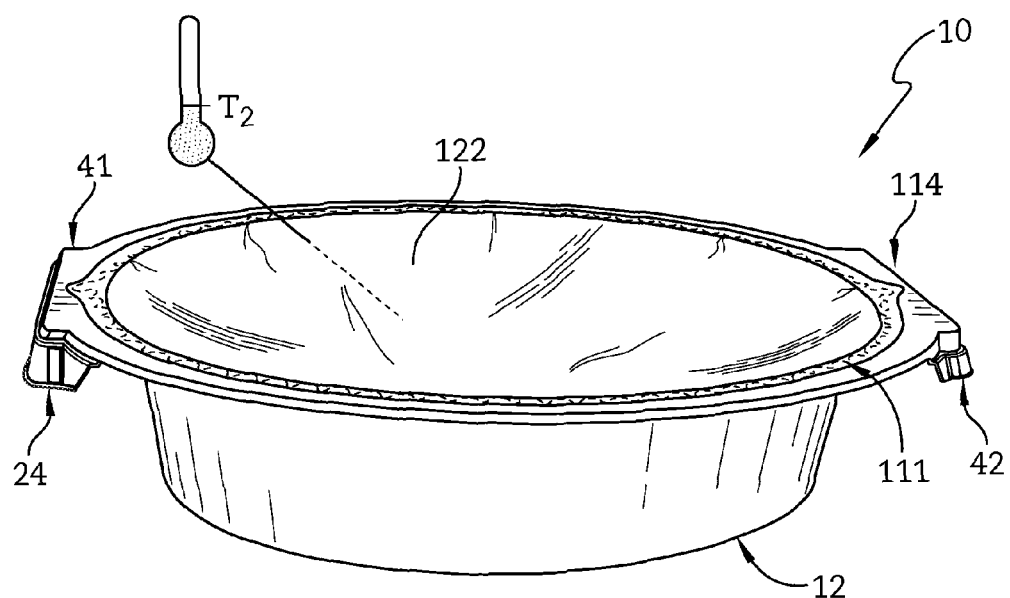
FIG. 9 is a view similar to FIG. 8 showing the package after heating has been completed and the package has been allowed to cool to a second lesser temperature $T_2$.
Figure 10:
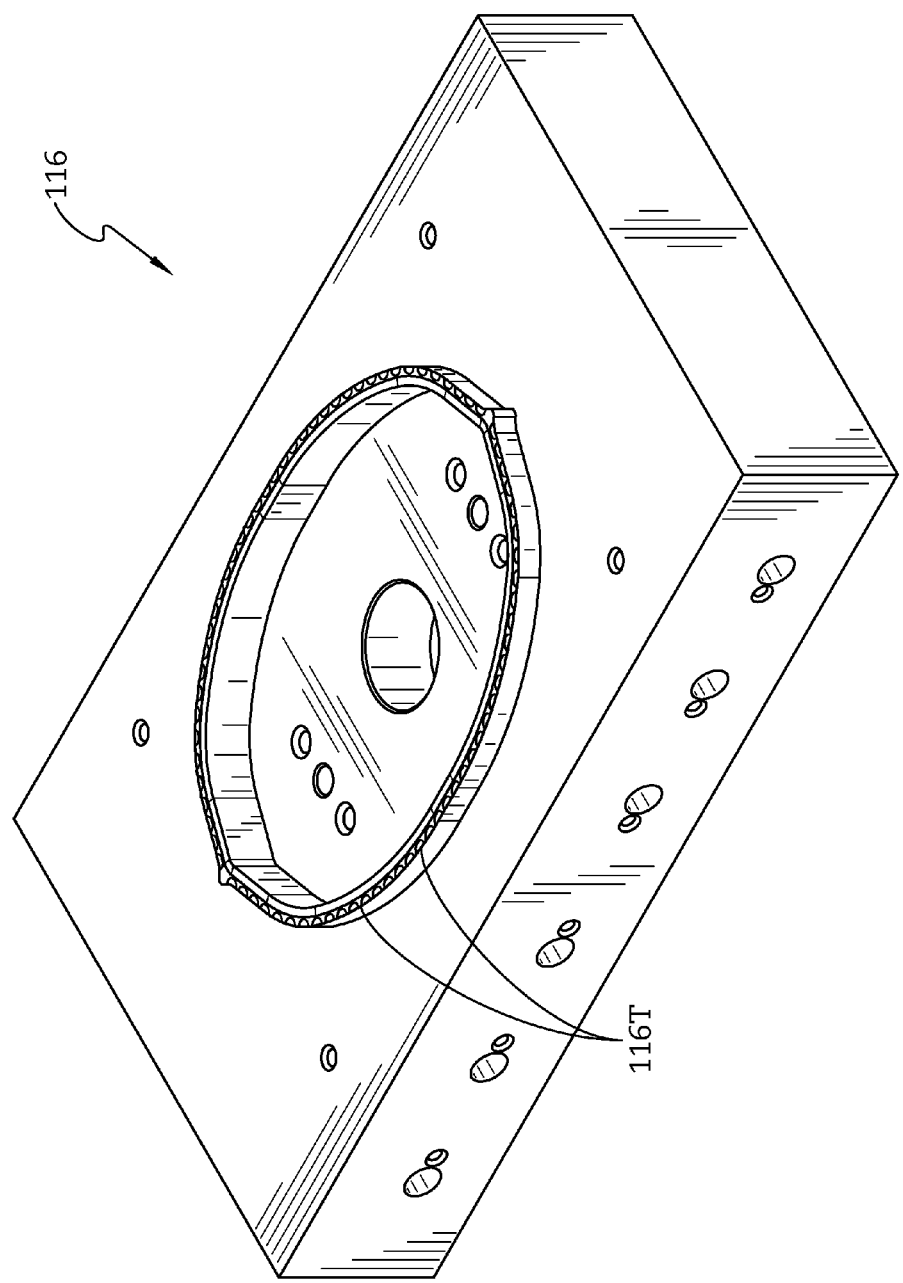
FIG. 10 is perspective view of a movable heated sealing head in accordance with the present disclosure used to form the package of FIGS. 1-9.
Figure 11:
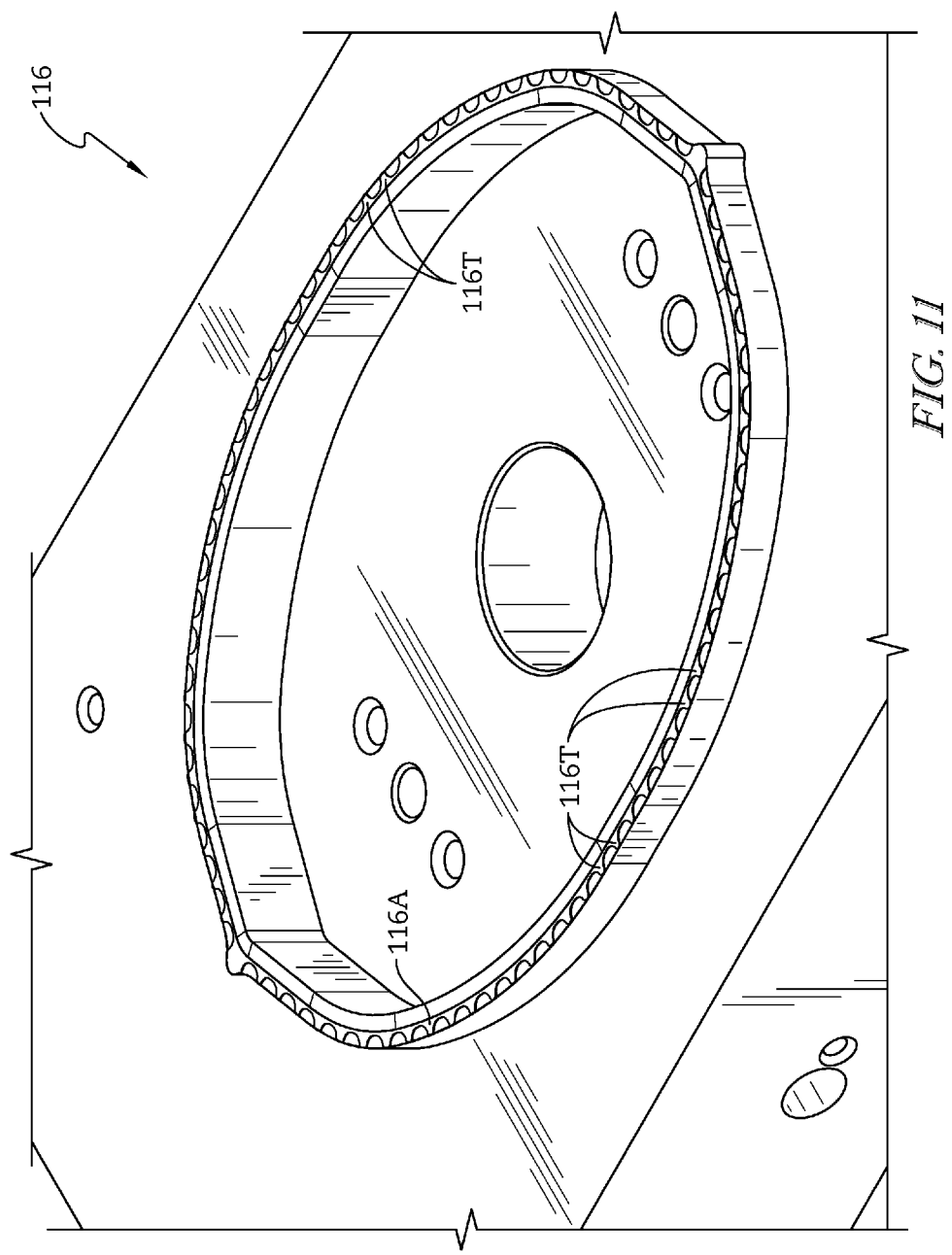
FIG. 11 is an enlarged partial perspective view of the movable heated sealing head of FIG. 10 showing that the movable heated sealing head includes an inner heated ring and a series of spaced-apart tether formers extending outwardly from the inner heated ring.
Figure 12:
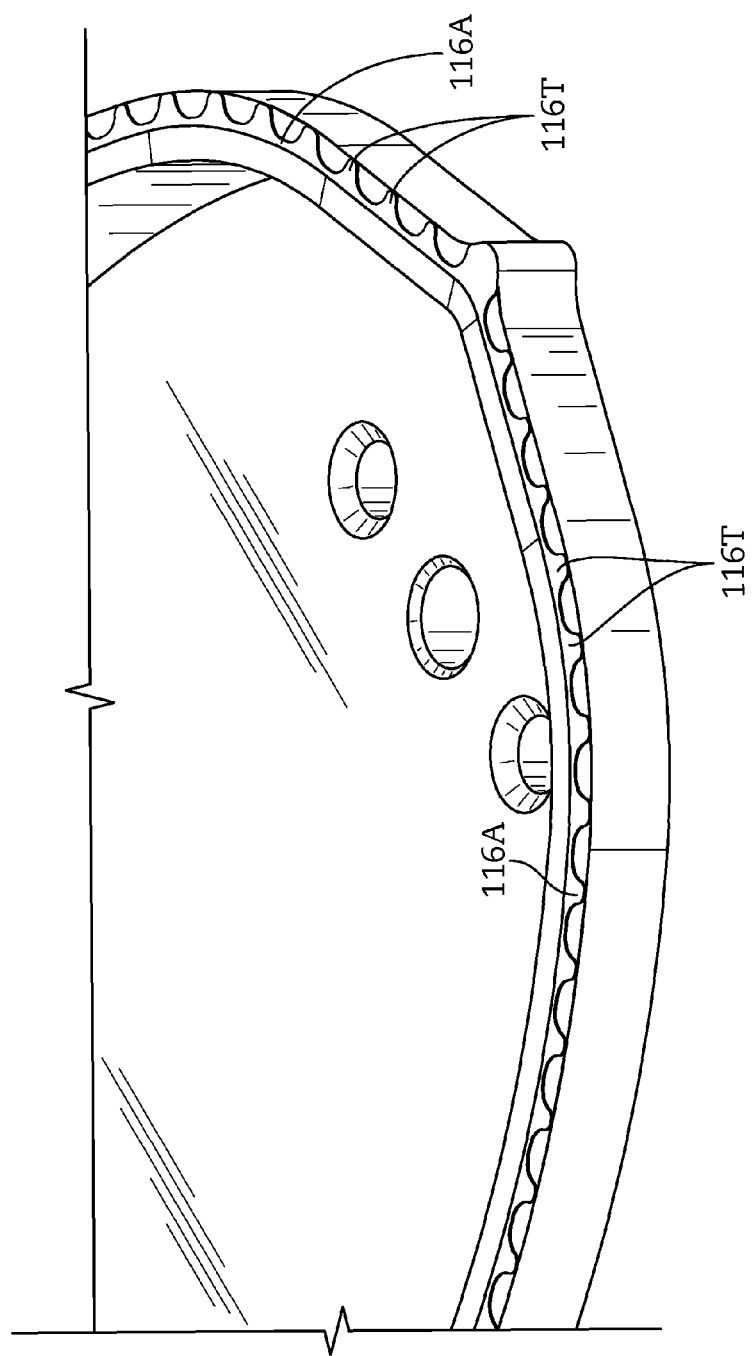
FIG. 12 is an enlarged partial perspective view of a portion of FIG. 11.
Figure 13:
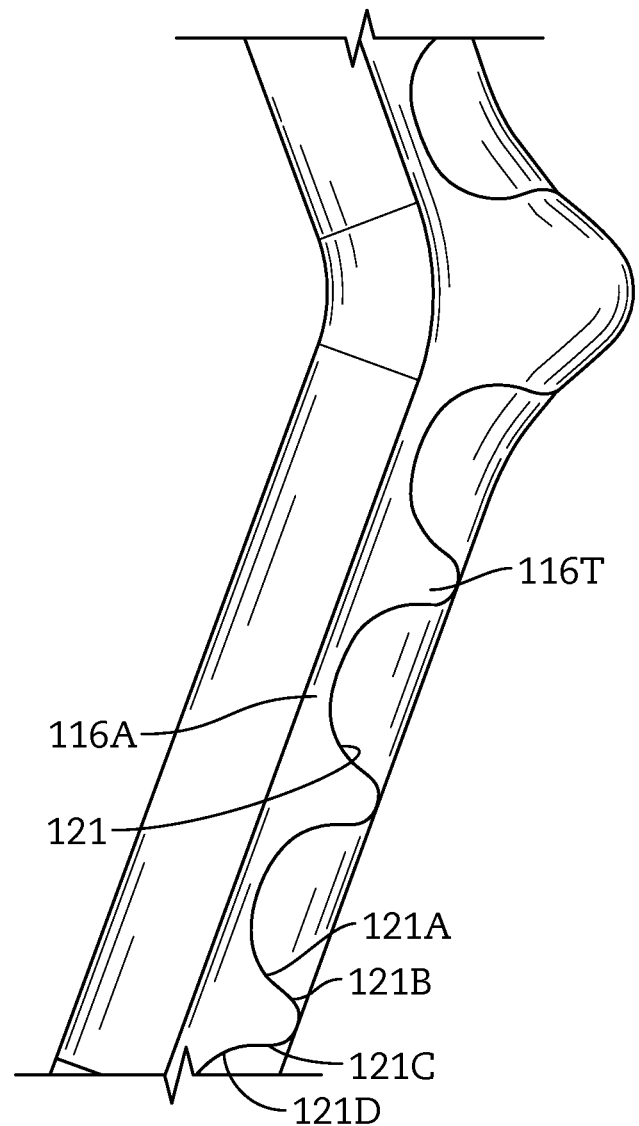
FIG. 13 is an enlarged partial plan view of a portion of FIG. 12 showing various dimensions of the inner heated ring and the series of spaced-apart tether formers.

Each sealed tether 111T is formed to include an outer edge 113 as shown in FIG. 13. Outer edge 113 includes, in series, a first curved portion 113A, a second curved portion 113B, a third curved portion 113C, and a fourth curved portion 113D as shown in FIG. 5. First curved portion 113A has a radius of curvature of about 0.063 inches with a center point located between inner sealed annular ring 111A and sheet-support ring 24. Second curved portion 113B has a radius of curvature of about 0.022 inches with a center point located between unsealed region 111C and inner sealed annular ring 111A. Third curved portion 113C has a radius of curvature of about 0.022 inches with a center point located between unsealed region 111C and inner sealed annular ring 111A. Fourth curved portion 113D has a radius of curvature of about 0.063 inches with a center point located between inner sealed annular ring 111A and sheet-support ring 24.

Hermetic steam-venting system 111 includes an inner sealed annular ring 111A, a series of spaced-apart sealed tethers 111T, and an outer sealed ring 111B as suggested in FIG. 4. Inner sealed annular ring 111A is located between sheet-support ring 24 and interior product-storage region 15 as shown in FIG. 4. Spaced-apart sealed tethers 111T are appended to inner sealed annular ring 111A and arranged to extend outwardly away from interior product-storage region 15 toward sheet-support ring 24. Outer sealed ring 111B is located between spaced-apart sealed tethers 111T and a perimeter edge 24P of sheet-support ring 24. An unsealed region 111C is formed between membrane sheet 122, brim 18, sealed tethers 111T, and inner sealed annular ring 111A.

Inner sealed annular ring 111A is formed as a result of establishing the temporary bond between membrane sheet 122 and brim 18. Spaced-apart sealed tethers 111T are formed as a result of establishing the temporary bond between membrane sheet 122 and brim 18. Outer sealed ring 111B is formed as result of establishing the permanent bond between membrane sheet 122 and sheet-support ring 24.

Inner sealed annular ring 111A has a generally constant width 19 of about 0.0875 inches and is arranged to extend around and surround opening 16. Width 19 is selected so that the temporary bond that forms inner sealed annular ring 111A fails when interior product-storage region 15 is exposed to a predetermined amount of heat.

Each sealed tether 111T is spaced apart from every other neighboring sealed tether 111T. As a result, an outer portion 111P1 of pressurized air-discharge outlet 111P is formed between each pair of neighboring sealed tethers 111T. Each sealed tether 111T is formed to include an outer edge 113 as shown in FIG. 13. Outer edge 113 includes, in series, a first curved portion 113A, a second curved portion 113B, a third curved portion 113C, and a fourth curved portion 113D as shown in FIG. 13. First curved portion 113A has a radius of curvature of about 0.063 inches with a center point located between inner sealed annular ring 111A and sheet-support ring 24. Second curved portion 113B has a radius of curvature of about 0.022 inches with a center point located between unsealed region 111C and inner sealed annular ring 111A. Third curved portion 113C has a radius of curvature of about 0.022 inches with a center point located between unsealed region 111C and inner sealed annular ring 111A. Fourth curved portion 113D has a radius of curvature of about 0.063 inches with a center point located between inner sealed annular ring 111A and sheet-support ring 24.

A hermetic steam-venting system in accordance with the present disclosure may include any number of suitable tethers. In one example, the hermetic steam-venting system includes only two tethers spaced apart from one another so that only a single discharge outlet is established as a result of heat being applied to the package. However, any suitable number of tethers may be used.

In another example, the hermetic steam-venting system includes only two tethers and a variable width inner sealed annular ring. The variable width inner sealed annular ring may have one thickness between the two tethers and a relatively greater thickness everywhere else in the variable width inner sealed ring. As a result of heating, the inner sealed annular fails at the relatively thin width between the tethers in a controlled, predictable manner.

Movable sealing head 116 includes an inner heated ring 116A and a series of spaced-apart heated tether formers 116T. Inner heated ring 116A is configured to establish inner sealed annular ring 111A. Spaced-apart heated tether formers 116T are configured to establish associated sealed tethers 111T. An outer heated ring (not shown) is configured to establish outer sealed ring 111B. The outer heated ring may be incorporated in the same movable sealing head 116 as inner heated ring 116A and spaced-apart heated tether formers 116T or in a separate movable sealing head used only to establish closure 114.

Inner heated ring 116A has a generally constant width 19 of about 0.02 inches. As a result, associated inner sealed annular ring would have a width of about 0.02 inches and be arranged to extend around and surround opening 16. Width 19 is selected so that the temporary bond that forms the inner sealed annular ring fails when interior product-storage region 15 is exposed to a predetermined amount of heat. However, it is within the scope of the present disclosure for both inner heated ring 116A and inner sealed annular ring to have varying thicknesses.

Each heated tether former 116T is configured to establish an associated sealed tether. Each heated tether former 116T is formed to include an outer edge 121 as shown in FIG. 13. Outer edge 121 includes, in series, a first curved portion 121A, a second curved portion 121B, a third curved portion 121C, and a fourth curved portion 121D as shown in FIG. 13. First curved portion 121A has a radius of curvature of about 0.063 inches. Second curved portion 121B has a radius of curvature of about 0.022 inches. Third curved portion 121C has a radius of curvature of about 0.022 inches. Fourth curved portion 121D has a radius of curvature of about 0.063 inches as shown in FIG. 13.

In an example of use, package 110 may be exposed to heat by placing package 110 into a heating device. In one example, heat is produced by microwave energy and the heating device is a microwave oven. In another example, heat may be produced by thermal energy and the heating device may be a heating element in a conventional gas or electric oven. In another example, heat is produced by electromagnetic energy and the heating device may be an induction heating element in an oven. In another example, heat is produced through transferring thermal energy by convection from a hot fluid to the package.

As a result, temperatures in interior product-storage region 15 increase to a point where steam or other heated fluid is generated in interior product-storage region 15. As steam is generated, steam-venting system 111 formed between closure 114 and brim 18 is configured to provide means for controlling steam pressure generation in interior product-storage region 15 so that food is heated uniformly throughout. Steam-venting system 111 is a hermetic steam-venting system 111 that substantially encloses and blocks the movement of fluids between interior product-storage region 15 and atmosphere surrounding package 110 until sufficient heating has occurred.

After heating is complete, package 110 is left to cool so that a user may open package 110. The user waits until the temperature in interior product-storage region 15 has decreased and then grasps sheet-separator lever arm 41 and applies the pivot-inducing lifting force $F_1$. Sheet-separator lever arm 41 provides mechanical advantage to apply relatively greater peeling force $F_2$ to peel-initiation point P1 on a perimeter edge of the peel-initiation section of membrane sheet 22. Each spaced-apart sealed tether 111T is configured to provide means for establishing peel-continuation points P2 at each tip 119 of sealed tether 111T so that an amount of work required to remove closure 114 from container 12 is minimized.

Another embodiment of a movable sealing head 216 used to establish a package in accordance with the present disclosure is shown in FIG. 14. Movable sealing head 216 includes an inner heated ring 216A, a series of spaced-apart heated tether formers 216T, and an outer heated ring 216B. Inner heated ring 216A is configured to establish an inner sealed annular ring. Spaced-apart heated tether formers 216T are configured to establish a series of associated sealed tethers. Outer heated ring 216B is configured to establish an outer sealed ring.

Inner heated ring 216A has a generally constant width 219 of about 0.058. As a result, associated inner sealed annular ring would have a width of about 0.058 inches and be arranged to extend around and surround opening 16. Width 219 is selected so that the temporary bond that forms the inner sealed annular ring fails when interior product-storage region 15 is exposed to a predetermined amount of heat.

Each heated tether former 216T is configured to establish an associated sealed tether. Each heated tether former 216T is formed to include an outer edge 213 as shown in FIG. 14. Outer edge 213 includes, in series, a first curved portion 213A, a second curved portion 213B, a third curved portion 213C, and a fourth curved portion 213D as shown in FIG. 14. First curved portion 213A has a radius of curvature of about 0.075 inches. Second curved portion 213B has a radius of curvature of about 0.0108 inches. Third curved portion 213C has a radius of curvature of about 0.0108 inches. Fourth curved portion 213D has a radius of curvature of about 0.0750 inches as shown in FIG. 14.

In one example, each spaced-apart tether former 216B is spaced-apart from each neighboring tether former 216B by about 10 degrees as shown in FIG. 14. However, tether formers may be spaced apart from one another by an arc of about 5 degrees, 20 degrees, 30 degrees, or any other suitable alternative. In one example, tether former spacing may be influenced by an amount of pressure to be generated in an interior-product storage region of a package.

Another embodiment of a package 310 in accordance with the present disclosure is shown in FIG. 15. Package 310 includes container 312, a closure 314 configured to mount on container 312, and a hermetic steam-venting system 311 as shown in FIG. 15. Steam-venting system 311 is configured to regulate movement of fluids between interior product-storage region 315 and atmosphere surrounding package 310 during application of a predetermined amount of heat so that food products located in interior product-storage region 315 are heated uniformly throughout.

As shown in FIG. 15, closure 314 includes a membrane sheet 322 made of a thin film and a sheet-support ring 324 configured to mate permanently with membrane sheet 322 in a permanent sheet-bonding zone provided on an endless upwardly facing top surface of sheet-support ring 324. Sheet-support ring 324 is configured to mate with brim 318 in the ring-support zone provided in outer perimeter region 318O of the endless upwardly facing top surface of brim 318 when closure 314 is mounted on container 312 to close package 310 as shown in FIG. 15.

Membrane sheet 322 of closure 314 is also configured to mate temporarily with an endless inner perimeter region 318I of brim 318 in a temporary sheet-bonding zone to establish an endless hermetic seal between container 312 and closure 314 when sheet-support ring 324 is first mounted on container brim 318 at a package-filling factory to cause closure 314 to close opening 316 formed in container 312. It is within the scope of this disclosure to use any suitable means to provide such a temporary bond and an endless hermetic seal between membrane sheet 322 of closure 314 and brim 318 of container 312 at a package-filling factory. In one example, the temporary bond is a chemical bond provided using a movable sealing head. The movable sealing head provides heat to portions of closure 314 so as to establish the chemical bond. This temporary bond and the hermetic seal are broken the first time a consumer removes closure 314 from container brim 318.

Hermetic steam-venting system 311 includes a series of spaced-apart apertures 320 formed in membrane sheet 322 and a peel strip 326. Peel strip 326 is arranged to cover and close apertures 320 during storage and transportation. In one example, peel strip 326 is coupled to membrane sheet 322 by a pressure sensitive adhesive. Spaced-apart apertures 320 are arranged to extend completely through membrane sheet 322 to provide a passageway for steam to escape during heating. Peel strip 326 closes off apertures 320 to provide a hermetic closure 314 that withstands retort. When a user desires to heat package 310, peel strip 326 is removed by the user prior to heating so that the apertures 320 are exposed allowing steam to be communicated from interior product-storage region 315 to atmosphere surrounding package 310.

In another example, membrane sheet 322 is a multi-layer film. The multi-layer film may be a STEAMQUICK® brand film sold by Berry Plastics Corporation of Evansville, Ind. In one example, apertures 320 are arranged to extend completely through membrane sheet 322. In another example, apertures 320 are arranged to extend through some, but not all, of the layers included in the multi-layer film. Peel strip 326 may be coupled to the multi-layer film to reinforce the multi-layer film near apertures 320 so that package 310 survives retort with the hermetic seal intact. When a user desires to heat package 310, peel strip 326 is removed by the user prior to heating so that the apertures 320 open during heating allowing steam to be communicated from interior product-storage region 315 to atmosphere surrounding package 310.

Another embodiment of a package in accordance with the present disclosure includes a container, a closure configured to mount on the container, and a hermetic steam-venting system. The steam-venting system is configured to regulate movement of fluids between an interior product-storage region formed in the container and atmosphere surrounding the package during application of a predetermined amount of heat so that food products located in the interior product-storage region are heated uniformly throughout.

In one example, the closure is a membrane sheet made of a thin film. In some instances, the membrane sheet may be referred to as a lidstock. The membrane sheet may also be a multi-layer film. The membrane sheet is configured to mate temporarily with an endless inner perimeter region of a brim included in the container in a temporary sheet-bonding zone to establish an endless hermetic seal between the container and the closure when the closure is first coupled to the container brim at a package-filling factory to cause the closure to close an opening formed in the container. It is within the scope of this disclosure to use any suitable means to provide such a temporary bond and an endless hermetic seal between the membrane sheet and the brim at a package-filling factory. In one example, the temporary bond is a chemical bond provided using a movable sealing head. The movable sealing head provides heat to portions of the closure so as to establish the chemical bond. This temporary bond and the hermetic seal are broken the first time a consumer removes the closure from the container brim.

The movable sealing head also establishes the hermetic steam-venting system in the temporary sheet-bonding zone. As shown in FIGS. 2-5, the hermetic steam-venting system is formed to include a series of spaced-apart tethers and an inner sealed annular ring. During heating, pressure builds in the interior-product storage region until at least a portion of the inner sealed annular ring is peeled away from the brim. As a result, pressurized steam is allowed to flow out of the interior product-storage region between one or more pairs of neighboring tethers. Hermetic steam-venting system is configured so as to control venting of pressurized steam in the interior product storage region so that a desired pressure and temperature inside the interior product-storage region is maintained during heating and venting.

Another embodiment of a package in accordance with the present disclosure includes a pouch and a hermetic steam-venting system. The steam-venting system is configured to regulate movement of fluids between an interior product-storage region formed in the pouch and atmosphere surrounding the package during application of a predetermined amount of heat so that food products located in the interior product-storage region are heated uniformly throughout.

The pouch may be any suitable type of pouch including, but not limited to, a pillow pouch, a single-gusset pouch, or a double-gusset pouch. The pouch is made, for example, from a membrane sheet made of a thin film. The membrane sheet may also be a multi-layer film. The pouch is formed from the membrane sheet so that an opening is formed in the pouch. The membrane sheet is mated to itself at the opening to close the opening in a temporary sheet-bonding zone so that a closure is established. As a result, an endless hermetic seal and a hermetic steam-venting system are established between portions of an inner surface of the pouch along the opening. The hermetic seal and steam-venting system is established at a package-filling factory.

It is within the scope of this disclosure to use any suitable means to provide such a temporary bond and an endless hermetic seal between and the hermetic steam-venting system at a package-filling factory. In one example, the temporary bond is a chemical bond provided using a movable sealing head. The movable sealing head provides heat to portions of the pouch so as to establish the chemical bond. This temporary bond and the hermetic seal are broken the first time a consumer opens the pouch at the closure.

The movable sealing head also establishes the hermetic steam-venting system in the temporary sheet-bonding zone. The hermetic steam-venting system is formed to include a series of spaced-apart tethers and an inner sealed band. During heating, pressure builds in the interior-product storage region until at least a portion of the inner sealed band to fail. As a result, pressurized steam is allowed to flow out of the interior product-storage region between one or more pairs of neighboring tethers. Hermetic steam-venting system is configured so as to control venting of pressurized steam in the interior product storage region so that a desired pressure and temperature inside the interior product-storage region is maintained during heating and venting.

Figure 16:
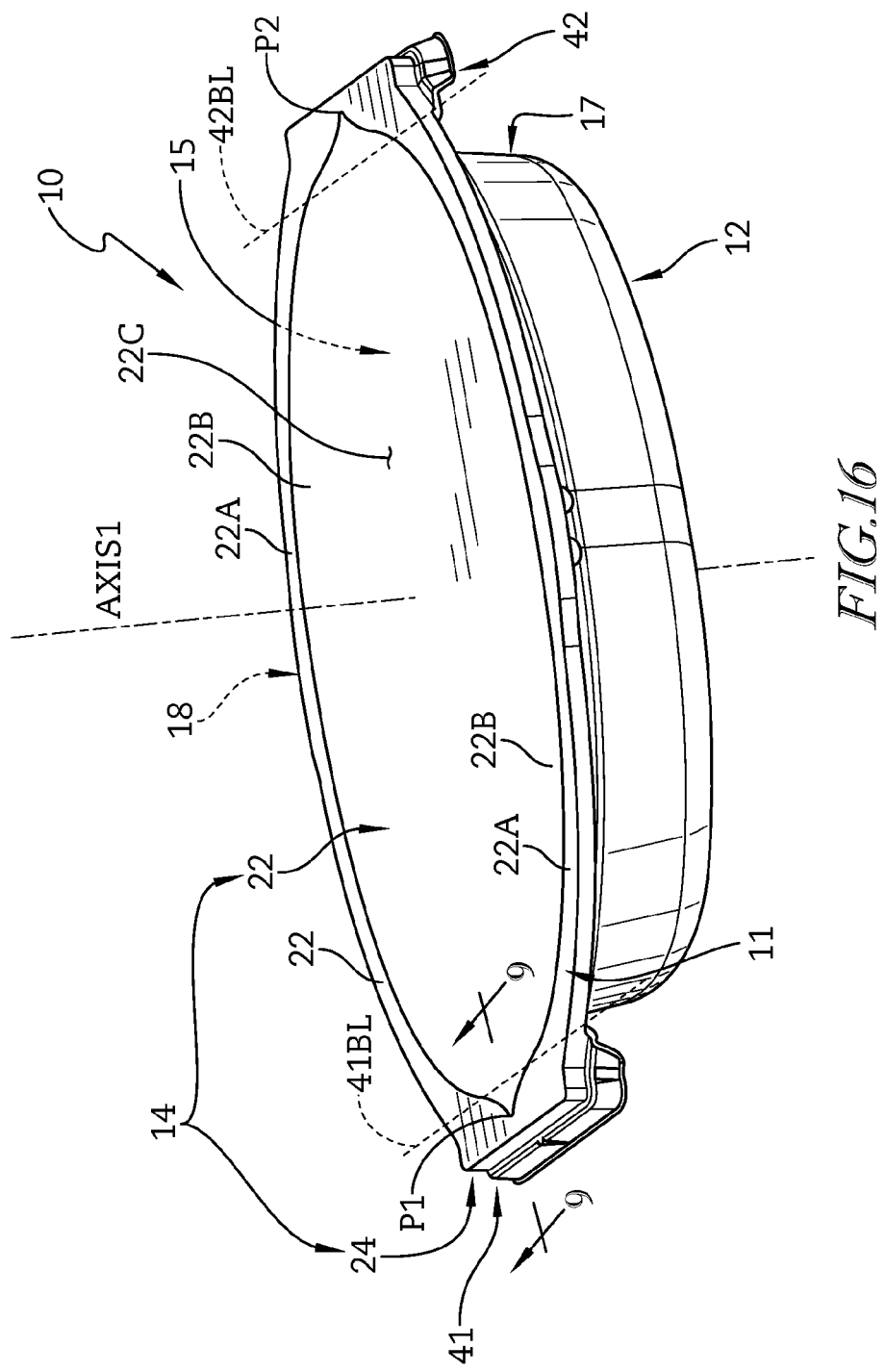
FIG. 16 is a perspective view of another embodiment of a package in accordance with the present disclosure suggesting that a middle portion of a membrane sheet included in a closure is bonded temporarily to an inner perimeter portion of a container brim included in a container and that an outer portion of the membrane sheet is bonded permanently to the sheet-support ring.
Figure 17:
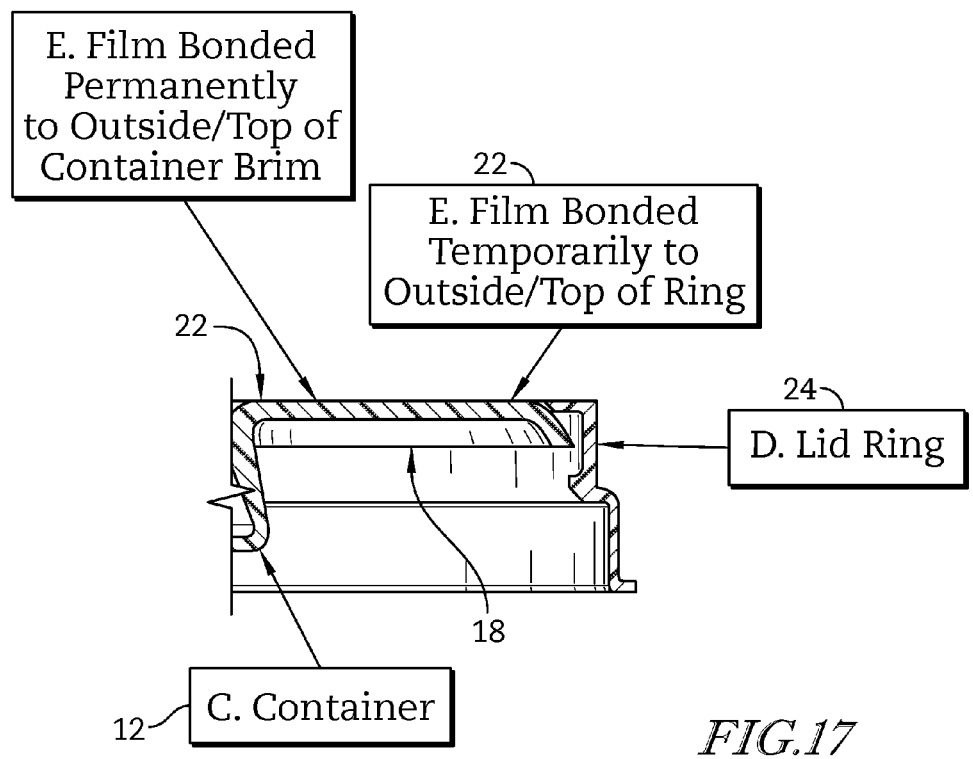
FIG. 17 is an enlarged sectional view of a portion of one end of the package of FIG. 16 taken along line 17-17 of FIG. 16 showing that the membrane sheet is a thin film that is bonded temporarily to an upwardly facing top surface on the container brim and bonded permanently to an upwardly facing top surface on one of the pivotable sheet-separator lever arms included in the sheet-support ring.
Figure 23:
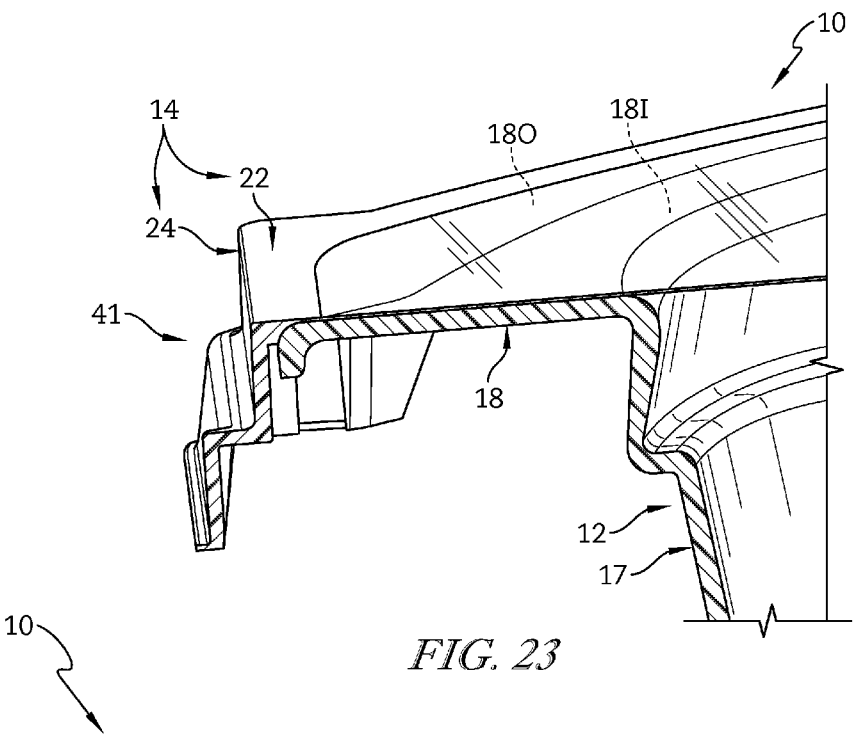
FIG. 23 is an enlarged partial perspective view of the package of FIGS. 16-20 taken along line 23-23 of FIG. 16.

A package 10 in accordance with the present disclosure includes a container 12 and a closure 14 mounted on container 12 as shown in FIGS. 16, 17, and 23. As suggested in FIG. 20, container 12 includes a brim 18 and closure 14 includes a membrane sheet 22 made of a thin film and a sheet-support ring 24 configured to mate permanently with membrane sheet 22 in a permanent sheet-bonding zone provided on an endless upwardly facing top surface of sheet-support ring 24. Sheet-support ring 24 is configured to mate with brim 18 in a ring-support zone provided in an outer perimeter region 18O of an endless upwardly facing top surface of brim 18 when closure 14 is mounted on container 12 to close package 10 as suggested in FIGS. 16, 17, and 23. Reference is hereby made to U.S. application Ser. No. 14/603,083 filed Jan. 22, 2015 and entitled PACKAGE WITH PEELABLE CLOSURE for disclosure relating to closures and containers, which application is hereby incorporated in its entirety herein.

Membrane sheet 22 of closure 14 is also configured to mate temporarily with an endless inner perimeter region 18I of brim 18 in a temporary sheet-bonding zone to establish an endless hermetic seal between container 12 and closure 14 when sheet-support ring 24 is first mounted on container brim 18 at a package-filling factory to cause closure 14 to close an opening 16 formed in container 12 as suggested in FIGS. 16, 18, 20, 22, and 24. It is within the scope of this disclosure to use any suitable means to provide such a temporary bond and an endless hermetic seal between membrane sheet 22 of closure 14 and brim 18 of container 12 at a package-filling factory. This temporary bond and the hermetic seal are broken the first time a consumer removes closure 14 from container brim 18.

Figure 18:
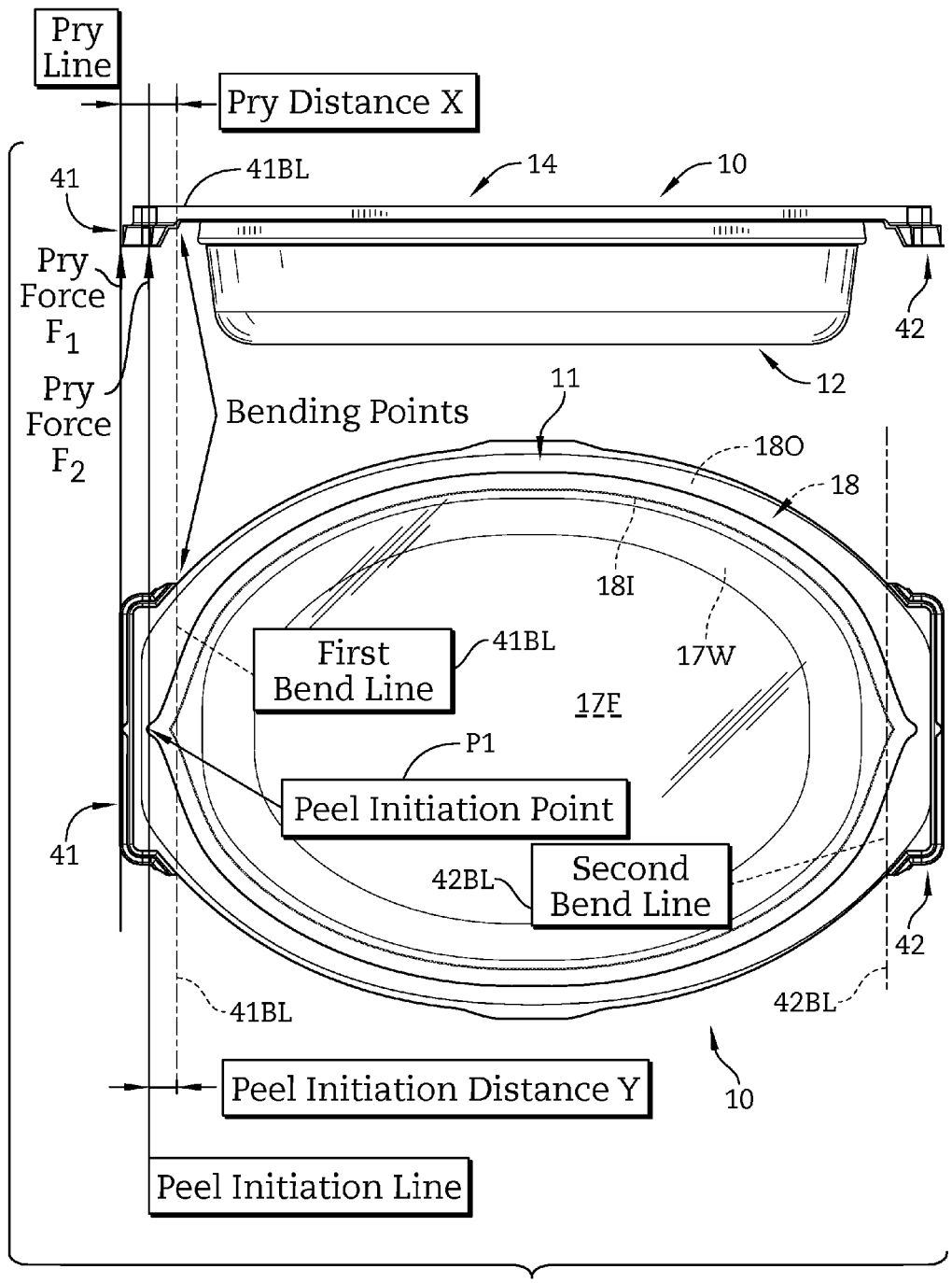
FIG. 18 is a diagrammatic view of aligned side elevation and top views of the package of FIG. 16 showing the location of a first bend line associated with the first pivotable sheet-separator lever arm provided on the left end of the sheet-support ring and the location of a peel-initiation point at the pointed tip of a peel-initiation section of the peelable membrane sheet in a sheet-bonding zone provided on the first pivotable sheet-separator lever arm in a location between a free end of the lever arm (on the left) and the first bend line (on the right) so that a mechanical advantage is created to apply an opening force to the peelable membrane sheet at the peel-initiation point that is greater than a pry force (F) applied by a consumer to the underside of the free end of the first pivotable sheet-separator lever arm in accordance with the present disclosure to make the hermetically-sealed package easier for consumers to open the first time.
Figure 24:
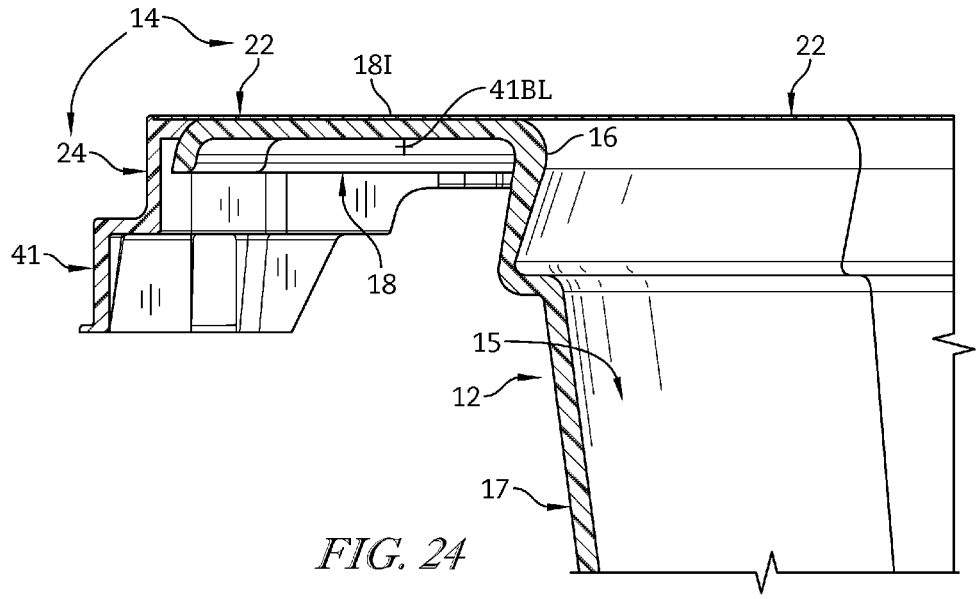
FIG. 24 is a side elevation view of the package portion shown in FIG. 23 when the first pivotable sheet-separator lever is in the original closed position and the membrane sheet of the closure is still hermetically sealed to the container brim in the temporary sheet-bonding zone because the package has never been opened by a consumer since the filled package left the factory.
Figure 25:
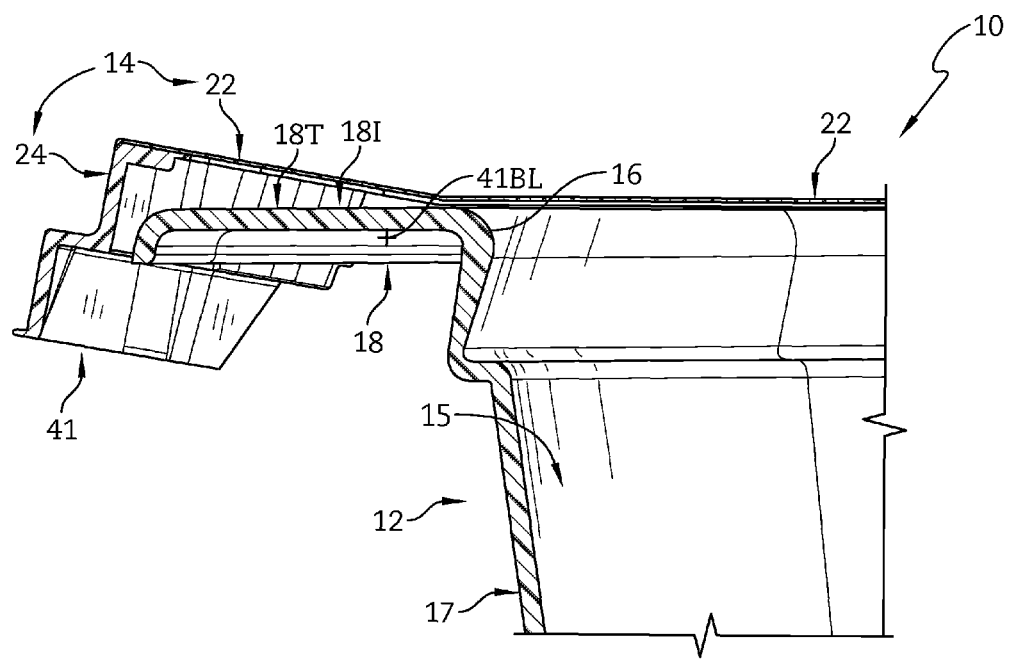
FIG. 25 is a sectional view similar to FIG. 24 after upward pivoting movement of the first pivotable sheet-separator lever arm about the fulcrum on the first bend line relative to the central brim-mount platform to break temporary bonds between a peel-initiation section of the peelable membrane sheet and an upwardly facing top surface on the container brim in the temporary sheet-bonding zone.
Figure 26:
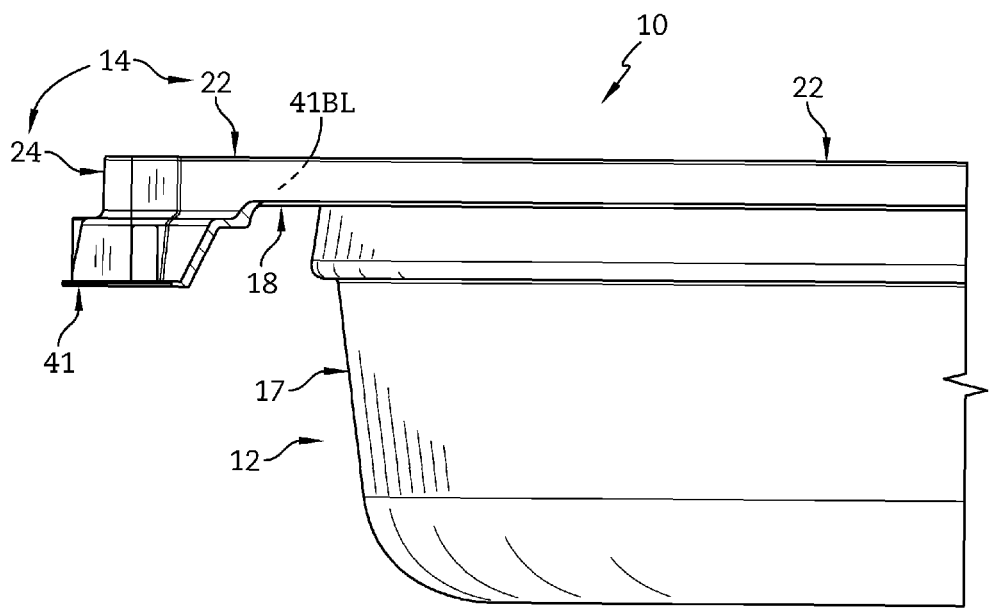
FIG. 26 is an enlarged side elevation view of a left-end portion of the package of FIGS. 16-20.
Figure 27:
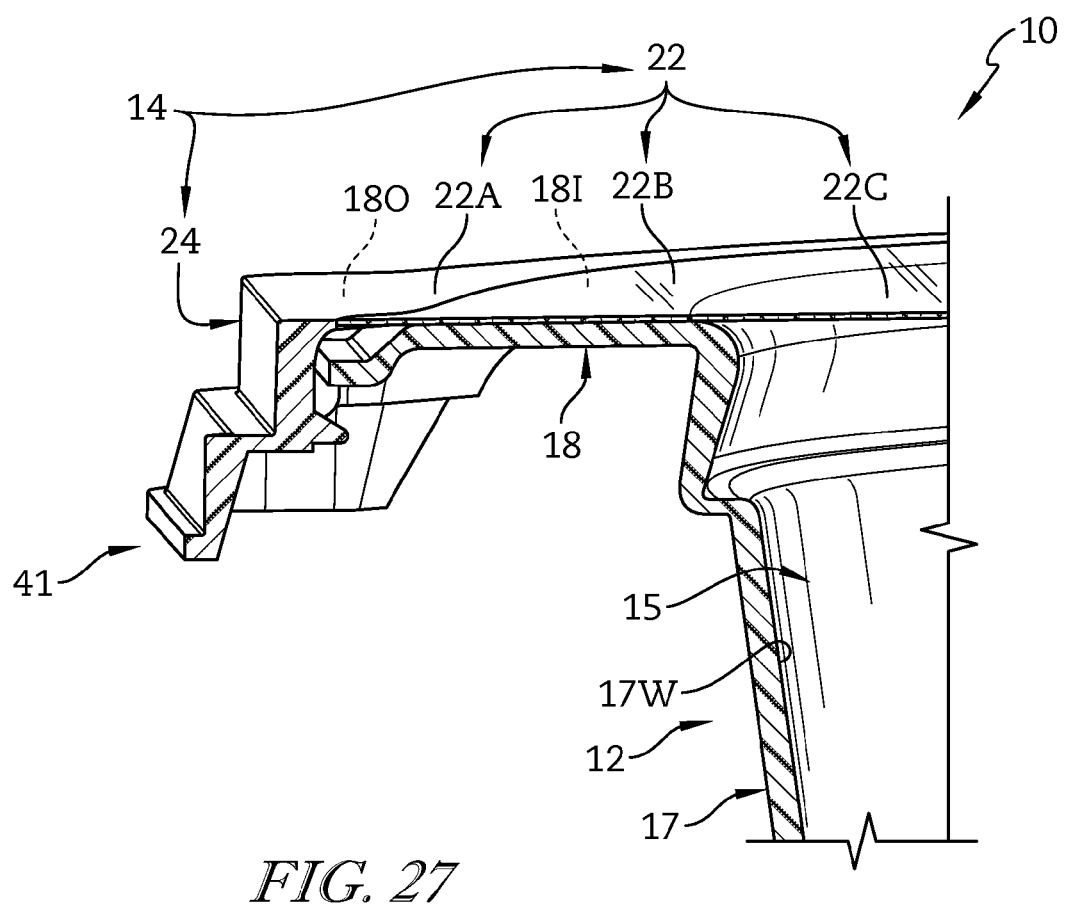
FIGS. 27-29 show a series of sectional perspective views of the left-end portion of the package during a closure-removal sequence that takes place the first time a consumer removes the closure from the container brim.
Figure 28:
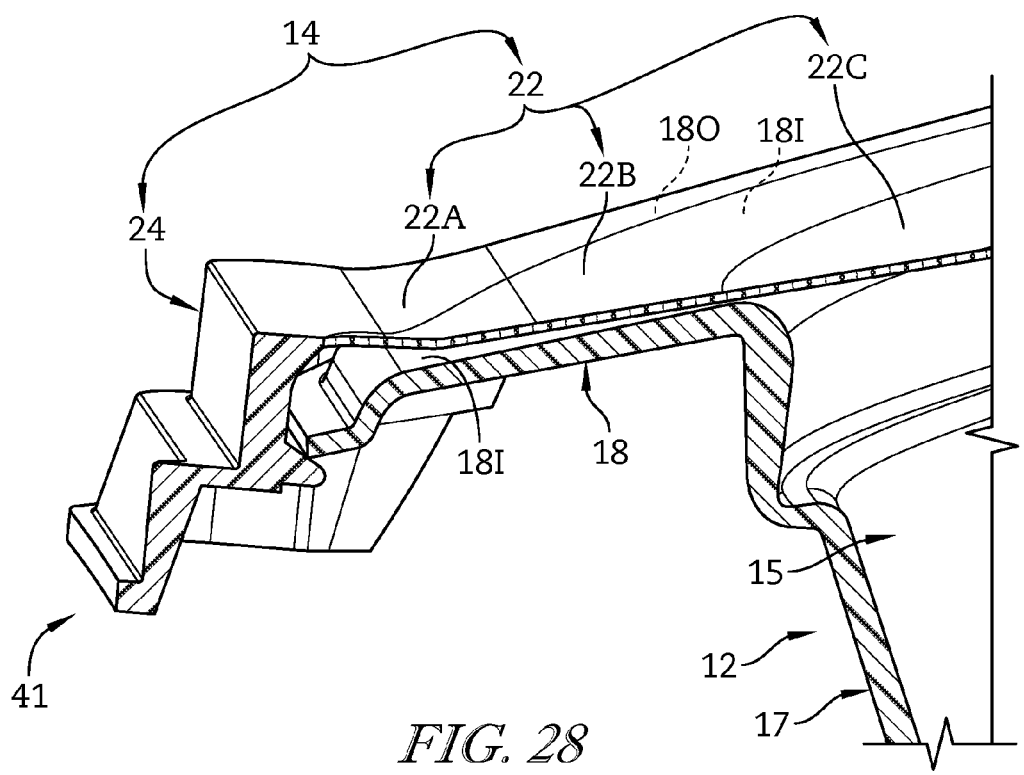
Figure 29:
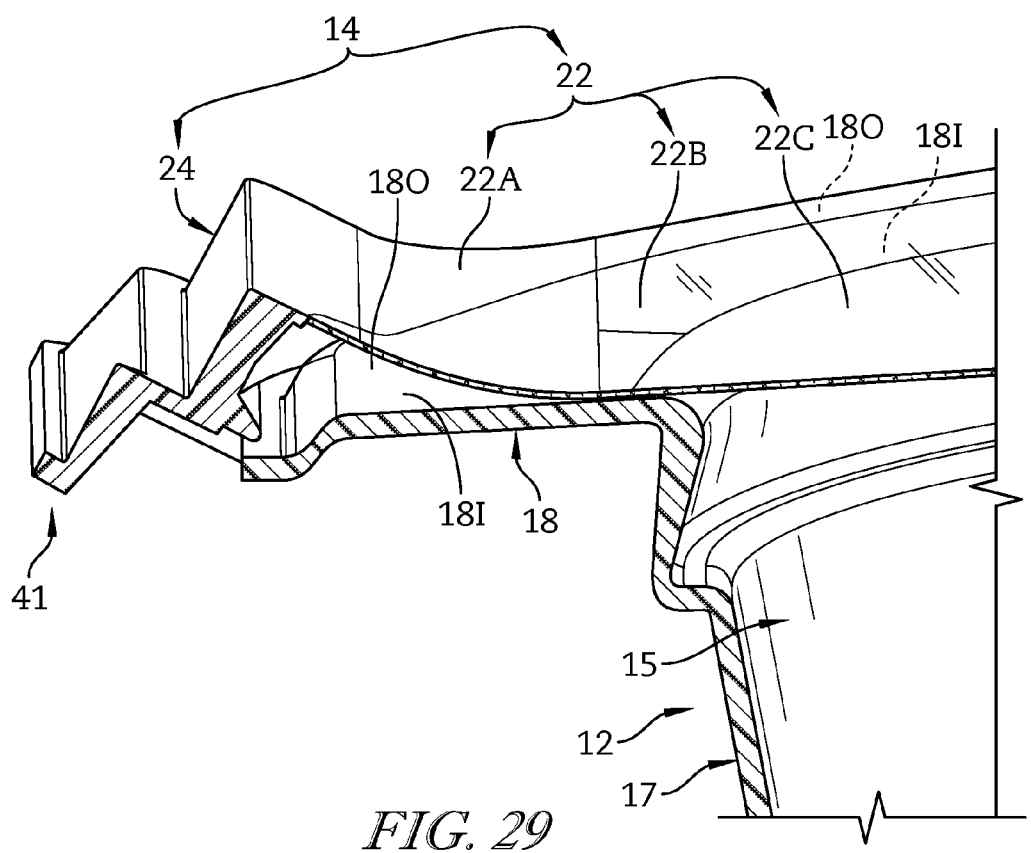

Sheet-support ring 24 of closure 14 includes a first pivotable sheet-separator lever arm 41 that is configured to be pivoted by a consumer about a first bend line 41BL relative to a stationary central brim-mount platform 43 of sheet-support ring 24 as suggested in FIG. 18 during a first-time opening of package 10 from an initial position shown, for example, in FIG. 24 to a pivoted peel-initiation position shown, for example, in FIG. 25. A package-opening sequence is also shown in FIGS. 27-29. By pivoting first pivotable sheet-separator lever arm 41 upwardly about a fulcrum on a first bend line 41BL as suggested in FIG. 26, a consumer can start to break the temporary hermetic-sealing bond established between membrane sheet 22 and endless inner perimeter region 18I of container brim 18 at a peel-initiation point P1 located between a free end 41F of first pivotable sheet-separator lever arm 41 and first bend line 41BL the first time package 10 is opened by the customer to access an interior product-storage region 15 formed in container 12. The consumer can then re-mount closure 14 on container 12 to reclose package 10 without establishing any hermetic seal between closure 14 and container 12 as often is desired by mating sheet-support ring 24 of closure 14 with the outer perimeter region 18O of container brim 18. While first pivotable sheet-separator lever arm 41 is provided at one end of closure 14, a similar second pivotable sheet-separator lever arm 42 is provided at an opposite end of closure 14 as suggested in FIGS. 16, 18, and 20. This makes it easy for a consumer to open package 10 from either end 41 or 42.

Package 10 is configured to receive and store products such as food. Container 12 is formed to define interior product-storage region 15 as suggested in FIGS. 16 and 20. Closure 14 is configured to mount on brim 18 of container 12 to close a top opening 16 formed in container 12 so as to block access to interior product-storage region 15.

Figure 20:
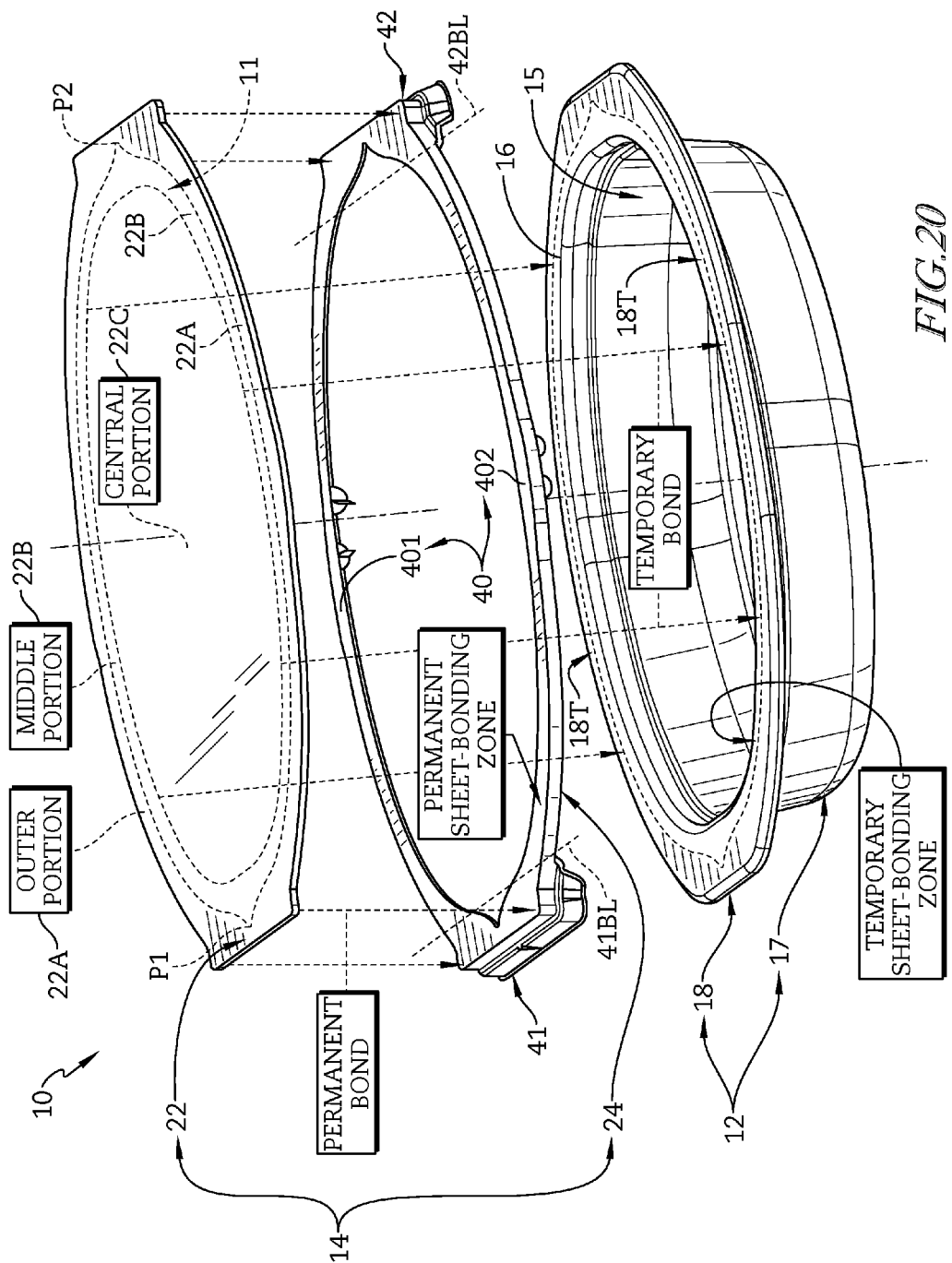
FIG. 20 is an exploded perspective assembly view of the package of FIGS. 16 and 17 showing (from bottom to top) a container including a bowl, an overhanging brim coupled to the bowl, a sheet-support ring including a central brim-mount platform comprising two spaced-apart curved strips, a first pivotable sheet-separator lever coupled for pivotable movement about a fulcrum at a first bend line to a left end of each of the curved strips defining the central brim-mount platform, and a second pivotable sheet-separator lever coupled for pivotable movement about a fulcrum at a second bend line to a right end of each of the curved strips defining the central brim-mount platform, and a membrane sheet made of a thin film and adapted to be bonded permanently to a permanent sheet-bonding zone formed on an endless upwardly facing top surface of the sheet-support ring and to be bonded temporarily to a temporary sheet-bonding zone formed on an inner perimeter region of an endless upwardly facing top surface of the container brim.
Figure 21:
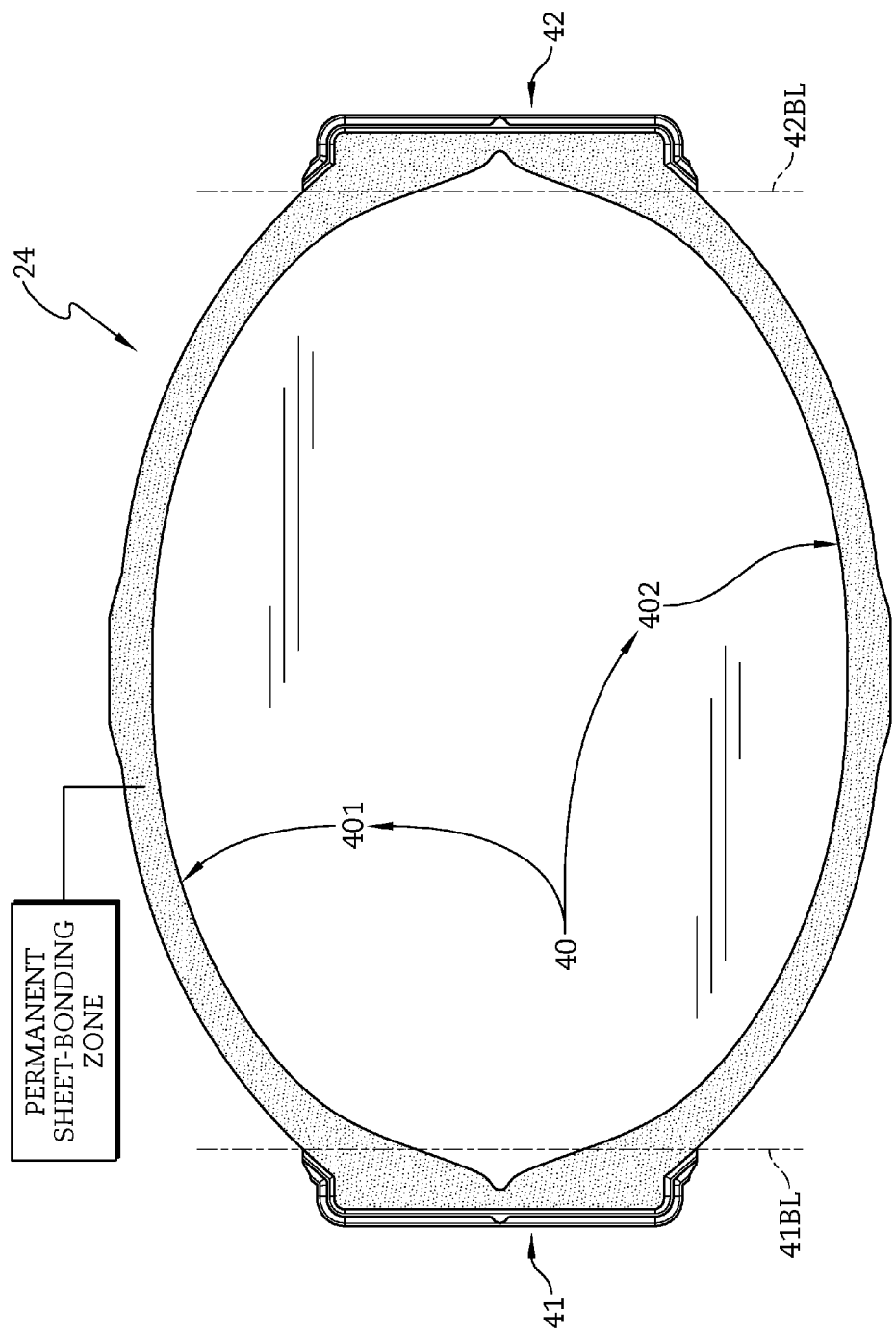
FIG. 21 is an enlarged top plan view of the sheet-support ring of FIG. 20 showing the permanent sheet-bonding zone provided on an endless upwardly facing top surface of the sheet-support ring.

Container 12 includes a bowl 17 and brim 18 as shown for example, in FIG. 20. Brim 18 is coupled to a top portion of bowl 17 and arranged to extend in radially outward directions away from top opening 16 as shown, for example, in FIG. 20. Bowl 17 includes a floor 17F and a side wall 17W as suggested in FIG. 22. An upwardly facing top surface 18T of container brim 18 is formed to include an endless inner perimeter region 18I bordering and surrounding top opening 16 and an outer perimeter region 18O surrounding endless inner perimeter region 18I as shown, for example, in FIG. 22. Inner perimeter region 18I provides a temporary sheet-bonding zone as suggested in FIG. 20. Outer region 18O of upwardly facing top surface 18T of container brim 18 is arranged to provide a shelf providing a ring-support zone to engage and support an underside of closure 14 when closure 14 is mated to container brim 18. Sheet-support ring 24 of closure 14 sets directly on outer perimeter region 18O of container brim 18 as suggested in FIGS. 20-22 when closure 14 is mounted on container brim 18.

Substantially flat membrane sheet 22 of closure 14 includes a central portion 22C, ring-shaped middle portion 22B surrounding central portion 22C, and a ring-shaped outer portion 22A surrounding ring-shaped middle portion 22B as shown, for example, in FIG. 20. Central portion 22C is arranged to cover the opening 16 that opens into interior product-storage region 15 formed in bowl 17 of container 12 as suggested in FIGS. 16, 19, and 20. Ring-shaped outer portion 22A is bonded permanently to a permanent sheet-bonding zone provided in an outer perimeter region 18O of an endless upwardly facing top surface of sheet-support ring 24. Ring-shaped middle portion 22B is bonded temporarily (using an adhesive, weld, or other suitable coupling means) to a temporary sheet-bonding zone provided in an inner perimeter region 18I of an upwardly facing top surface of brim 18 to create a hermetic seal therebetween until closure 14 is removed from brim 18 by a consumer for a first time to access the contents of interior product-storage region 15 formed in container 12.

Figure 22:
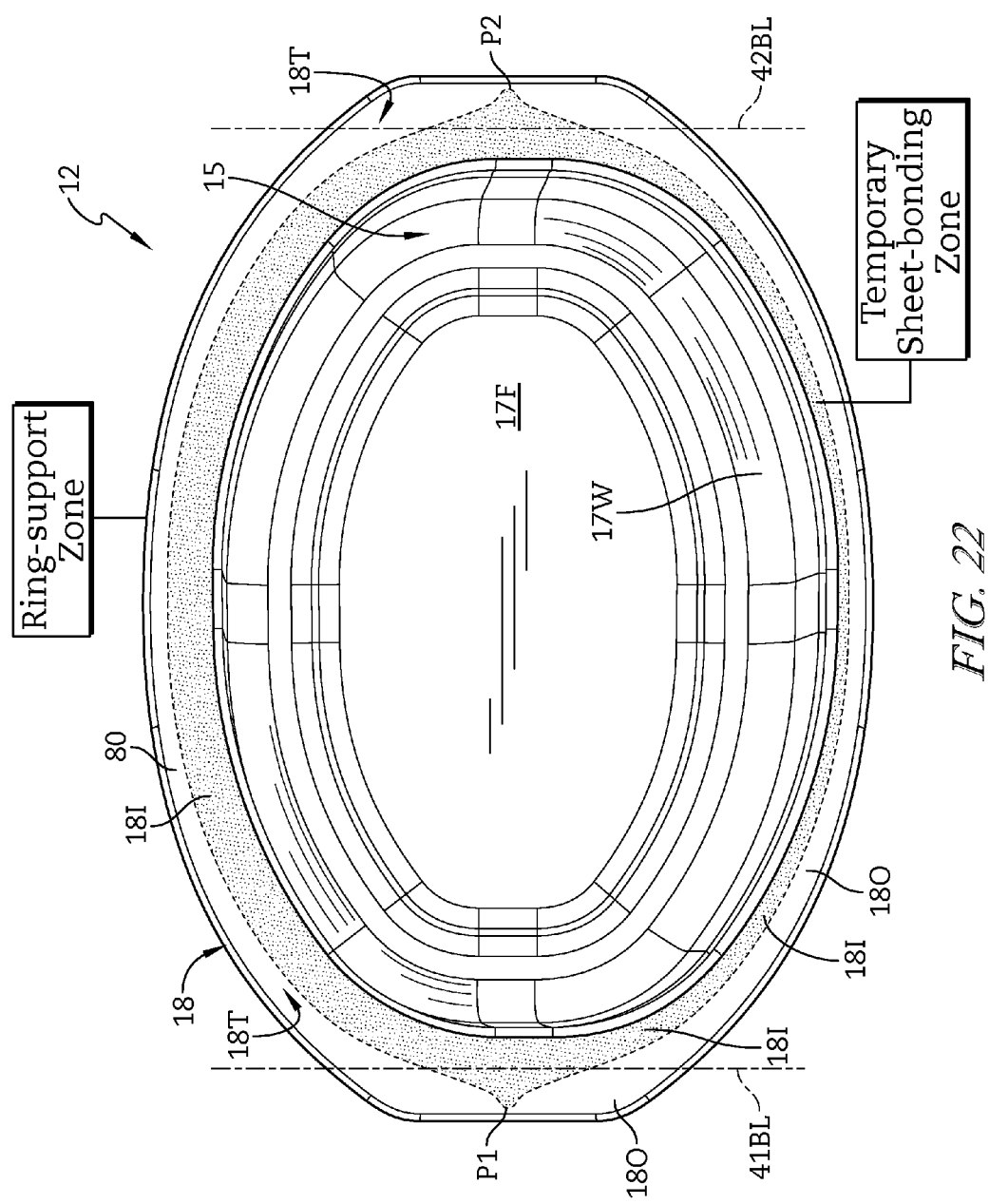
FIG. 22 is an enlarged top plan view of the container of FIG. 20 showing the temporary sheet-bonding zone provided on an inner perimeter region of an endless upwardly facing top surface of the container brim.

Endless inner perimeter region 18I of container brim 18 provides a temporary sheet-bonding zone for membrane sheet 22 as suggested in FIGS. 18, 20, and 22. Endless inner perimeter region 18I of top surface 18T of container brim 18 is arranged to mate with and to be sealed hermetically to a middle portion 22B of membrane sheet 22 of closure 14 when closure 14 is mated with and sealed to container brim 18 at a package-closing factory. It is the temporary hermetic seal established at the package-closing factory between the middle portion 22B of membrane sheet 22 of closure 14 and endless inner perimeter region 18I of container brim 18 that is broken when package 10 is opened the first time by a consumer as suggested in FIGS. 27-29.

Sheet-support ring 24 of closure 14 includes a central brim-mount platform 40, a first pivotable sheet-separator lever arm 41 coupled to a left end of brim-mount platform 40 for pivotable movement relative to brim-mount platform 40 about a first bend line 41BL, and a second pivotable sheet-separate lever arm 42 coupled to a right end of brim-mount platform 40 for pivotable movement relative to brim-mount platform 40 and a second bend line 42BL that is arranged to lie in spaced-apart parallel relation to first bend line 41BL as suggested in FIGS. 20, 24, and 25. Central brim-mount platform 40 illustratively includes a curved first strip 401 arranged to mate with an underlying portion of outer region 18O of top surface 18T of container brim 18 and a separate curved second strip 402 arranged to lie in spaced-apart relation to curved first strip 401 and mate with an underlying portion of outer region 18O of top surface 18T of container brim 18 when closure 14 is mounted on container brim 18 as suggested in FIGS. 19-21.

Package 10 includes a container 12 and a closure 14 adapted to mate with a brim 18 of container 12 to close a top opening 16 that opens into an interior product-storage region 15 formed in container 12. Closure 14 includes a sheet-support ring 24 adapted to be mated with and mounted on the outer region 18O of container brim 18 and a thin membrane sheet 22 bonded permanently to sheet-support ring 24 and arranged to cover top opening 16 formed in container 12 when sheet-support ring 24 is mounted on container brim 18.

Sheet-support ring 24 includes a brim-mount platform 40 mated to perimeter side portions of outer portion 22A of membrane sheet 22 and adapted to overlie and set on outer region 18O of container brim 18 when closure 14 is coupled to container brim 18. Sheet-support ring 24 further includes a sheet-separator lever arm 41 that is coupled to brim-mount platform 40 for pivotable movement relative to brim-mount platform 40 about a bend line 41BL caused by a consumer during a closure-removal activity from an initial position associated with a closed position of the closure on container brim as shown in FIG. 24 to a peel-initiation position associated with initial peeling separation of membrane sheet 22 from temporary bonding with container brim 18 as shown in FIG. 25. A package-opening sequence is also shown, for example, in FIGS. 27-29.

Sheet-separator lever arm 41 is arranged to extend outwardly away from container brim 18 and bend line 41BL to cause a free end of lever arm 41 to lie at a first (pry) distance (X) from first bend line 41BL as suggested in FIG. 18. A peel-initiation section of membrane sheet 22 is bonded temporarily to a sheet-bonding zone provided on the first pivotable sheet-separator lever arm 41 and located between first bend line 41BL and free end 41F of lever arm 41 at a factory when closure 14 is hermetically sealed in a mounted position on container brim 18 to close top opening 16 formed in container 12. Such temporary bonding of the peel-initiation section of membrane sheet 22 to the first pivotable sheet-separator lever arm 41 establishes a peel-initiation point P1 on a perimeter edge of the peel-initiation section of membrane sheet 22 at a second (peel-initiation) distance (Y) from first bend line 41BL in the sheet-bonding zone provided on the pivotable sheet-separator lever arm 41 of sheet-support ring 24. Second distance (Y) is less than first distance (X) in illustrative embodiments as shown, for example in FIG. 18.

The first pivotable sheet-separator lever arm 41 provides a closure rim structure that can be pivoted about a fulcrum on a first bend line 41BL to create a mechanical advantage to apply an opening force to the peel-initiation section of the peelable membrane sheet 22 of closure 14 to break the temporary bond between the peelable membrane sheet 22 and the first pivotable sheet-separator arm at the peel-initiation point P1 to facilitate closure removal during opening of package 10. Due to such mechanical leverage, the peeling force ($F_2$) applied to the peelable membrane sheet 22 at the peel-initiation point P1 is greater than a pivot-inducing lifting force ($F_1$) applied by a consumer to an underside of the free end 41F of the first pivotable sheet-separator lever arm 41 to cause upward pivoting movement of the first pivotable sheet-separator lever arm 41 about first bend line 41BL during a first step in a process of removing the hermetically sealed closure 14 from container brim 18 the first time package 10 is opened by a consumer. In the illustrated embodiment, the peeling force ($F_2$) and the pivot-inducing load force ($F_1$) are located on the same side of a fulcrum established on first bend line 41BL as suggested in FIG. 18. In such a second-class level mechanism, the peeling force ($F_2$) is equal to the pivot-inducing load force ($F_2$) multiplied by the first (pry) distance (X) and divided by the second (peel-initiation) distance (Y).

Figure 19:
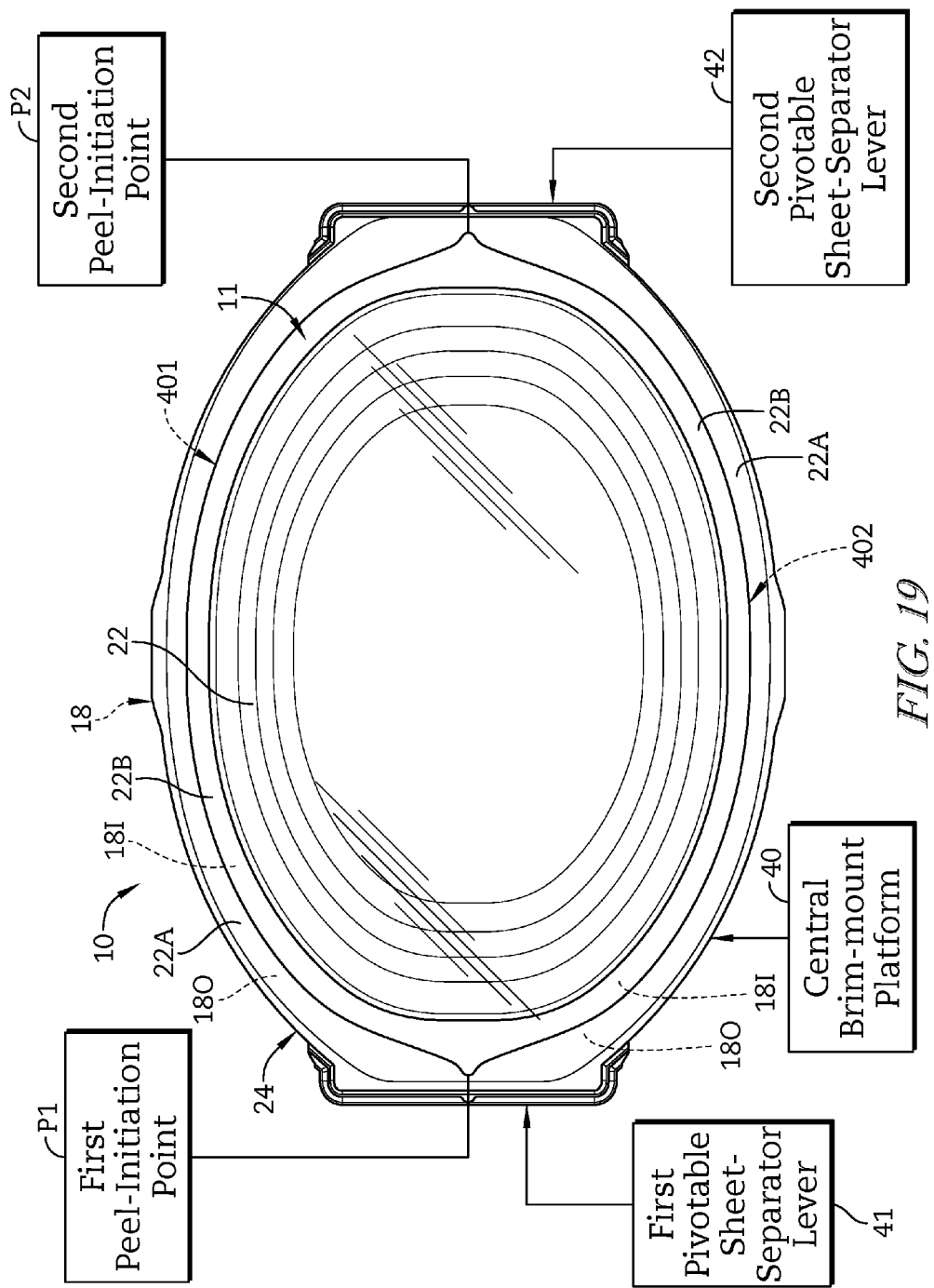
FIG. 19 is a top plan view of the package of FIG. 16 showing the location of a first peel-initiation point (P1) of the peelable membrane sheet of the closure on the left end of the package between the first bend line and a free end of the first pivotable sheet-separator lever arm and a second peel-initiation point (P2) of the peelable membrane sheet of the closure on the right end of the package between a second bend line and a free end of a second pivotable sheet-separator lever arm.

Closure 14 is mounted on a brim 18 of the container 12 and is made of a substantially flat membrane sheet 22 bonded permanently to an upwardly facing surface of a sheet-support ring 24 as suggested in FIGS. 16, 19, and 20. Sheet-support ring 24 includes a pivotable sheet-separator lever arm 41, 42 at each end and a central brim-mount platform 40. Brim-mount platform 40 is arranged to interconnect the two pivotable sheet-separator lever arms 41, 42 and defined by two spaced-apart curved side strips 401, 402. Membrane sheet 22 is a thin film that is bonded to upwardly facing surfaces on each of the container brim 18 and each of the pivotable sheet-separator lever arms 41, 42.

Aligned side elevation and top views of package 10 are provided in FIG. 18 to show the location of a first bend line 41BL associated with the first pivotable sheet-separator lever arm 41 provided on the left end of the sheet-support ring 24 and the location of a peel-initiation point P1 at the pointed tip of a peel-initiation section of the peelable membrane sheet 22 in a sheet-bonding zone provided on the first pivotable sheet-separator lever arm 41 in a location between a free end 41F of the lever arm 41 (on the left) and the first bend line 41BL (on the right) so that a mechanical advantage is created to apply a greater opening force to the peelable membrane sheet 22 at the peel-initiation point P1 to make the hermetically-sealed package 10 easier for consumers to open the first time. The first peel-initiation point P1 of the peelable membrane sheet 22 of the closure 14 on the left end of package 10 is provided between a first bend line 41BL and a free end 41F of a first pivotable sheet-separator lever arm 41 as suggested in FIGS. 18 and 19. A second peel-initiation point P2 of the peelable membrane sheet 22 of the closure 14 on the right end of package 10 is provided between a second bend line 42BL and a free end 42F of a second pivotable sheet-separator lever arm 42 as shown in FIG. 19.

Membrane sheet 22 is made of a thin film and is adapted to be bonded permanently to a permanent sheet-bonding zone formed on an upwardly facing surface of the sheet-support ring 24 and to be bonded temporarily to a temporary sheet-bonding zone formed on an inner portion of an upwardly facing surface 18T of the container brim 18. The permanent sheet-bonding zone on a top surface of the sheet-support ring 24 is shown, for example, in FIG. 21. The temporary sheet-bonding zone on an inner portion of the container brim 18 is shown, for example, in FIG. 22.

The first pivotable sheet-separator lever 41 is in the original closed position as shown, for example, in FIGS. 24 and 27. Membrane sheet 22 of the closure 14 is still hermetically sealed to the container brim 18 in the second sheet-bonding zone because the package 10 has never been opened by a consumer since the filled package left the factory. Pivoting movement of first pivotable sheet-separator lever arm 41 about first bend line 41BL relative to central brim-mount platform 40 as suggested in FIG. 25 and in FIGS. 28 and 29 breaks temporary bonds between a peel-initiation section of peelable membrane sheet 22 and an upwardly facing top surface 18T on container brim 18 in the second sheet-bonding zone.

In another example, a package in accordance with the present disclosure includes a container and a closure. The closure includes a membrane sheet coupled to a brim of the container to close a top opening formed in the container. The lid is coupled selective to the container to locate the membrane sheet between the container and lid. The package further includes a hermetic steam-venting system in accordance with the present disclosure.

The invention claimed is:

1. A package comprising
a container including a bowl formed to include an interior product-storage region and a brim coupled to an upper portion of the bowl and arranged to border a top opening into the interior product-storage region, the brim including an endless upwardly facing top surface including an endless inner perimeter region bordering and surrounding the top opening and providing an endless temporary sheet-bonding zone thereon and an outer perimeter region surrounding the endless inner perimeter region and providing a ring-support zone thereon,
a closure mounted on the brim in a closed position to close the top opening and block access to the interior product-storage region, the closure including a sheet-support ring arranged to engage the ring-support zone on the outer perimeter region of the endless upwardly facing top surface of the brim when the closure is positioned to lie in the closed position on the brim, and the closure further including a membrane sheet coupled to the sheet-support ring to move therewith relative to the brim of the container when the closure is separated from the brim to gain access to the interior product-storage region, and
a hermetic steam-venting system that provides a hermetic seal between the closure and the container until a user separates the closure from the container or a user applies a predetermined amount of heat to the interior product-storage region to cause sufficient pressure to form in the interior product-storage region so that a pressurized discharge outlet is formed between the membrane sheet and the brim of the container in the endless temporary sheet-bonding zone during heating,
wherein the steam-venting system includes an inner sealed annular ring located between the sheet-support ring and the interior product-storage region and a series of spaced-apart sealed tethers appended to the inner sealed annular ring and arranged to extend outwardly away from the interior product-storage region toward sheet-support ring.

2. The package of claim 1, wherein the membrane sheet includes a ring-shaped outer portion bonded permanently to the sheet-support ring to form an endless seal therebetween, a central portion surrounded by the ring-shaped outer portion and arranged to cover the top opening into the interior product-storage region when the closure is positioned to lie in the closed position on the brim, and a ring-shaped middle portion arranged to interconnect an outer perimeter edge of the central portion and an inner perimeter edge of the ring-shaped outer portion, the ring-shaped middle portion includes a downwardly facing surface arranged to overlie and confront the endless temporary sheet-bonding zone on the endless inner perimeter region of the endless upwardly facing top surface of the brim.

3. The package of claim 1, wherein the steam-venting system further comprises, an outer sealed ring arranged to lie in spaced-apart radial relation to inner sealed annular ring between inner sealed annular ring and a perimeter edge of the sheet-support ring.

4. The package of claim 3, wherein an unsealed region is formed between the membrane sheet, the brim, the spaced-apart sealed tethers, and the inner sealed annular ring.

5. The package of claim 4, wherein the outer sealed ring is formed as result of establishing a permanent bond between the membrane sheet and the sheet-support ring.

6. The package of claim 1, wherein the membrane sheet includes a ring-shaped outer portion bonded permanently to the sheet-support ring to form an endless seal therebetween, a central portion surrounded by the ring-shaped outer portion and arranged to cover the top opening into the interior product-storage region when the closure is positioned to lie in the closed position on the brim, and a ring-shaped middle portion interconnects an outer perimeter edge of the central portion and an inner perimeter edge of the ring-shaped outer portion, the ring-shaped middle portion includes a downwardly facing surface that overlies and confronts the endless temporary sheet-bonding zone on the endless inner perimeter region of the endless upwardly facing top surface of the brim and the inner sealed annular ring is arranged to extend around and surround the top opening and have a generally constant width.

7. The package of claim 6, wherein the width is configured to cause the temporary bond to fail when the interior product-storage region is exposed to a predetermined amount of heat and a predetermined pressure is generated in the interior product-storage region.

8. The package of claim 7, wherein the width is less than about 0.09 inches.

9. The package of claim 8, wherein the width is about 0.0875 inches.

10. The package of claim 1, wherein the membrane sheet includes a ring-shaped outer portion bonded permanently to the sheet-support ring to form an endless seal therebetween, a central portion surrounded by the ring-shaped outer portion and arranged to cover the top opening into the interior product-storage region when the closure is positioned to lie in the closed position on the brim, and a ring-shaped middle portion interconnects an outer perimeter edge of the central portion and an inner perimeter edge of the ring-shaped outer portion, the ring-shaped middle portion includes a downwardly facing surface that overlies and confronts the endless temporary sheet-bonding zone on the endless inner perimeter region of the endless upwardly facing top surface of the brim, and the pressurized discharge outlet is formed between at least one pair of neighboring spaced-apart sealed tethers as a result of the package being exposed to the predetermined amount heat.

11. The package of claim 10, wherein the predetermined discharge outlets are formed between each pair of neighboring spaced-apart sealed tethers as a result of the package being exposed to a predetermined amount of heat.

12. The package of claim 1, wherein the membrane sheet includes a ring-shaped outer portion bonded permanently to the sheet-support ring to form an endless seal therebetween, a central portion surrounded by the ring-shaped outer portion that covers the top opening into the interior product-storage region when the closure is positioned to lie in the closed position on the brim, and a ring-shaped middle portion that interconnects an outer perimeter edge of the central portion and an inner perimeter edge of the ring-shaped outer portion, the ring-shaped middle portion includes a downwardly facing surface that overlies and confronts the endless temporary sheet-bonding zone on the endless inner perimeter region of the endless upwardly facing top surface of the brim, and an outer sealed ring that lies in spaced-apart radial relation to inner sealed annular ring between inner sealed annular ring and a perimeter edge of the sheet-support ring wherein each spaced-apart sealed tether has an outer edge defined by, in series, a first curved portion, a second curved portion, a third curved portion, and a fourth curved portion.

13. The package of claim 12, wherein the first curved portion has a center point located between the inner sealed annular ring and the sheet-support ring.

14. The package of claim 13, wherein an unsealed region is formed between the membrane sheet, the brim, the spaced-apart sealed tethers, and the inner sealed annular ring and the second curved portion has a radius of curvature with a center point located between the unsealed region and the inner sealed annular ring.

15. The package of claim 14, wherein the third curved portion has a radius of curvature with a center point located between the unsealed region and the inner sealed annular ring.

16. The package of claim 15, wherein the fourth curved portion has a radius of curvature with a center point located between the inner sealed annular ring and the sheet-support ring.

17. The package of claim 12, wherein the radius of curvature of the first curved portion is about equal to the radius of curvature of the fourth curved portion.

18. The package of claim 17, wherein the radius of curvature of the second curved portion is about equal to the radius of curvature the third curved portion and the radius of curvature of the first and fourth curved portions is greater than the radius of curvature of the second and third curved portions.

19. The package of claim 1, wherein the hermetic steam-venting system is configured to provide a uniform pressure in the interior product-storage region during heating of the package.

20. A package comprising
a container including a bowl formed to include an interior product-storage region and a brim coupled to an upper portion of the bowl and arranged to border a top opening into the interior product-storage region, the brim including an endless upwardly facing top surface including an endless inner perimeter region bordering and surrounding the top opening and providing an endless temporary sheet-bonding zone thereon and an outer perimeter region surrounding the endless inner perimeter region and providing a ring-support zone thereon,
a membrane sheet coupled to the brim of the container, and
a hermetic steam-venting system that provides a hermetic seal between the membrane sheet and the container until a user separates the membrane sheet from the container or a user applies a predetermined amount of heat to the interior product-storage region to cause sufficient pressure to form in the interior product-storage region so that a pressurized discharge outlet is formed between the membrane sheet and the brim of the container in the endless temporary sheet-bonding zone during heating,
wherein the steam-venting system includes an inner sealed annular ring located in spaced-apart relation to the interior product-storage region and a series of spaced-apart sealed tethers appended to the inner sealed annular ring and arranged to extend outwardly away from the interior product-storage region.

21. The package of claim 20, wherein an unsealed region is formed between the membrane sheet, the brim, the spaced-apart sealed tethers, and the inner sealed annular ring.

* * * * *